(12) United States Patent
Swift

(10) Patent No.: US 6,877,399 B1
(45) Date of Patent: Apr. 12, 2005

(54) BICYCLE PEDAL THAT CAN FIT A MULTIPLICITY OF SHOE CLEATS

(76) Inventor: Paul Swift, 11207 Laurie Dr., Studio City, CA (US) 91604

( * ) Notice: Subject to any disclaimer, the term of this patent is extended or adjusted under 35 U.S.C. 154(b) by 323 days.

(21) Appl. No.: 09/975,417

(22) Filed: Oct. 10, 2001

Related U.S. Application Data

(63) Continuation-in-part of application No. 09/360,561, filed on May 26, 1999, now abandoned, which is a continuation-in-part of application No. 08/923,022, filed on Sep. 3, 1997, now abandoned.

(51) Int. Cl.[7] .............................................. G05G 1/14

(52) U.S. Cl. .................................. 74/594.6; 74/594.4

(58) Field of Search ............. 74/594.4, 594.6; 36/131; D12/125

(56) References Cited

U.S. PATENT DOCUMENTS

| | | | | |
|---|---|---|---|---|
| 5,211,076 A | * | 5/1993 | Baume et al. | 74/594.6 |
| 5,417,128 A | * | 5/1995 | Beyl | 74/594.6 |
| 5,692,415 A | * | 12/1997 | Lin | 74/594.6 |
| 5,806,379 A | * | 9/1998 | Nagano | 36/131 X |
| 6,035,743 A | * | 3/2000 | Gapinski et al. | 74/594.4 X |

* cited by examiner

Primary Examiner—Vinh T. Luong
(74) Attorney, Agent, or Firm—Thomas I. Rozsa; Tony D. Chen

(57) ABSTRACT

A flip-flop bicycle pedal that utilizes both sides of the pedal such that one side correspondingly matches with a prior art road type pedal configuration known in the art as LOOK pedal and the other side correspondingly matches with another prior art mountain type pedal configuration known in the art as SPD pedal. Alternatively, a plurality of pedal adapters that utilize conventional type bicycle pedal configurations which complementary match a plurality of prior art bicycle shoe cleats known in the art as LOOK cleat, SPD cleat, SPEEDPLAY "X" cleat, SPEEDPLAY frog cleat, and BE-BOP cleat.

4 Claims, 15 Drawing Sheets

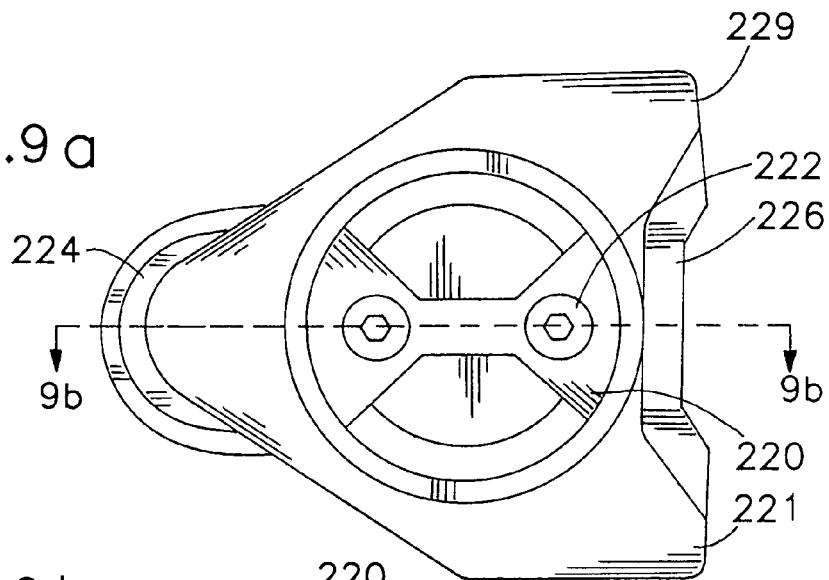
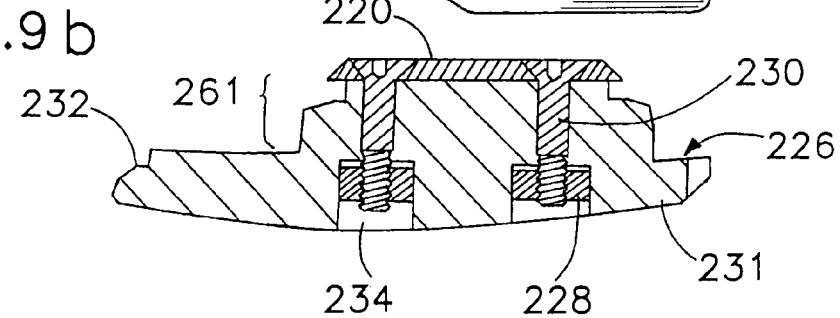
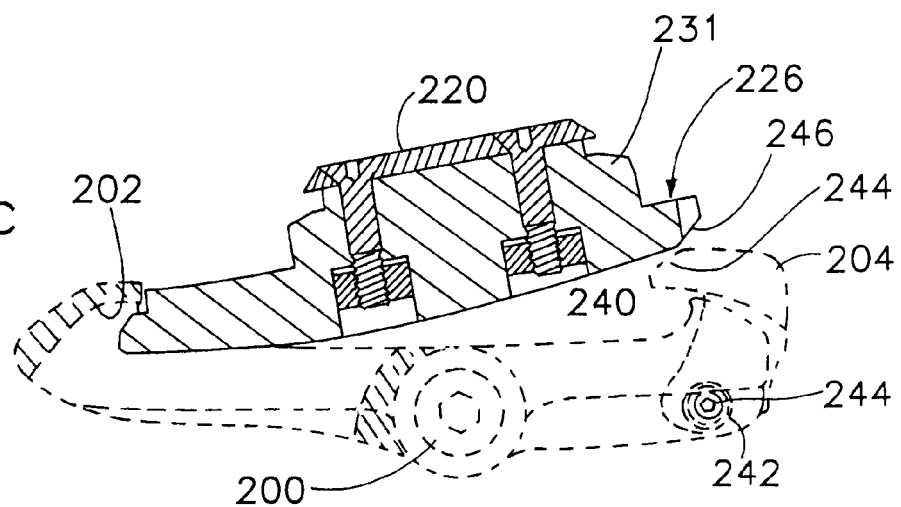

BICYCLE PEDAL THAT CAN FIT A MULTIPLICITY OF SHOE CLEATS

This application is a continuation-in-part of application Ser. No. 09/360,561 filed on May 26, 1999, now abandoned, which is a continuation-in-part of application Ser. No. 08/923,022 filed on Sep. 3, 1997, abandoned.

BACKGROUND OF THE INVENTION

1. Field of the Invention

This invention relates to bicycle pedals and in particular, to pedals that have a multiplicity of shapes that can accommodate a variety of bicycle shoe cleats. Use of the invention allows cyclists using clip-less pedal systems to cycle on a bicycle fitted with these multiple shaped pedals, when the cyclists have a variety of shoe cleat designs on their shoes.

2. Description of the Prior Art

The continuing development of modern bicycles has resulted today in bikes being available to the general public with a wide variety of pedal designs. Early designs of bicycle pedals consisted of a flat pedal shape with a toe frame that fitted most cyclist's shoes, and included a strap or other connecting means that fixed or fastened the toes of the cyclist's shoes to the pedals. Cycling shoes were typically of a running shoe design and were not specifically designed for cycling.

In modern bicycle pedal designs this arrangement has been superseded by more precise mechanisms that lock the pedal onto special cleats which are fastened to the base of the cyclist's shoes. These new designs are called clip-less pedal/cleat designs. Using these new designs, the cyclist mounts the bicycle, places his shoe cleat onto the pedal and the pedal/cleat combination snaps or locks together creating a stable connection between the cyclist's feet and the bicycle pedal.

Various designs of pedal/cleat combinations are presently in use, which either lock rigidly together or allow various degrees of freedom of rotational motion between the pedal and the cleat, depending on the design. Manufacturers of pedals today typically produce pedal designs that require the use of special shoe cleats that lock onto or into their pedals only. This ensures the manufacturer that the cyclist buys their particular combined pedal/cleat products.

Thus modern cyclists require a particular design of matching shoe cleat to be worn on their cycling shoes in order to fit onto the pedals on their bicycles. Due to the better performance and ease of entry and exit of these new pedal/cleat designs, this is now the generally accepted standard in the case of the cyclist's own bicycle. Individual cyclists fit their preferred pedals onto their bicycles and fit the appropriate cleats onto their cycling shoes.

In recent years, there has been increasing interest and use of stationary exercise bicycles and many of the companies that manufacture road bicycles or other exercise equipment have also developed a line of stationary exercise bikes to meet this new demand. However, when these same pedal/cleat combinations developed initially for road bicycles are also used on the stationary cycling machines (or spin-bikes as they are known) which are available in gyms or sports clubs, the cyclist is forced to use the appropriate cleat on his bicycle shoes.

This causes problems, as most cyclists prefer to use a particular brand and design of pedal/cleat combination on their road bicycles, and yet many cyclists have no choice but to purchase a new set of cycling shoes and install cleats that match the gym's spin bike pedals. Alternatively, cyclists have to bring their own pedals to the gym or exercise club and exchange the pedals on the stationary bike with their own so they can use their own shoes and cleats to exercise. This practice is becoming less and less acceptable to gym instructors who do not want different riders to be changing pedals on their exercise bikes.

Another problem that has arisen on stationary bikes is the breakage of pedal spindles. The pedal spindle is a steel rod that fits inside the pedal center housing with bearings, allowing the pedal to rotate around the spindle. The end of the spindle projects from the side of the pedal and contains a threaded section that is used to connect the pedal to the bicycle crank arm. Breakage of this spindle is extremely rare in outdoor bikes even among world class powerful cyclists and is a phenomenon that occurs quite frequently on stationary bikes probably caused by the higher forces that come to bear on an indoor exercise bike's pedal as explained below.

Part of this breakage problem of spindles is caused by the fact that the frame of a stationary bike is more rigid than the frame of a street or racing bicycle and so there is less 'give' or flex available in the frame of the stationary bike. Also, the frame of all exercise bikes sits on the floor supported at four corners by rollers or foot stands. The frame itself is quite rigid when compared to a road bike, since weight is not a premium on an exercise bike. Thus when a rider bears down heavily on one pedal of the stationary bike, the bike does not rotate in the same direction as the pedal load nor does the frame flex, and so all of the extra load is carried in bending by the pedal spindle.

Repeated over-stressing of the spindle in this manner results in spindle failures causing the pedal to suddenly break off the spin bike pedal crank and with the attendant danger of injury to the rider. In some exercise clubs or gyms, pedal spindle breakage is a common occurrence and has increased the costs of maintenance and downtime of equipment and the number of spare parts that must be carried to keep the bikes in good running condition. Exercise clubs are also very aware of the increased possibility of injury that can occur when one of the spindles breaks, thus increasing their liability risks.

Manufacturers of spin bikes generally ensure that their own designs of pedal/cleat combinations are interchangeable. However, there is no interest on the part of these manufacturers to make their pedal/cleat designs compatible with any of their competitor's designs. This has created a serious inconvenience and difficulty in the use of spin bikes, which are used by a wide variety of cyclists and non-cyclists who are clients of a gym or exercise clubs. The clients of the gym or club wish to use their own particular brand of pedal/cleats and the gym can only offer a very limited selection.

Generally the exercise clubs offer the pedals sold to them with the exercise or spin bike by the particular spin bike manufacturer. To get around the problem, the gym may have to purchase spin bikes from a number of suppliers or change the pedals on their existing bikes to accommodate a wider variety of user preferences.

There is no known prior art in the field of pedal/cleat designs that fully addresses the pedal/cleat and spindle problems discussed above. In an earlier patent application, the present inventor disclosed a design for a flip-flop pedal, which is a first step to address the problem. The earlier application disclosed a pedal design which utilized both sides of the pedal surfaces so that one side matches a pedal type, embodied in the popular brand known as LOOK (the generic term for LOOK is a road bicycle style pedal). The other side of the pedal surface matches a pedal type embodied in the popular brand known as SPD (the generic term for SPD is a mountain bicycle style pedal). This earlier design of a LOOK/SPD (road/mountain) flip-flop pedal is disclosed and illustrated in the earlier application Ser. No. 08/923,022.

LOOK is a French company that makes a variety of products, one of which is a line of bicycle pedals and matching cleats. SPD is also a matching pedal/cleat design for bicycles made by the Shimano Pedaling Device Co., of Japan. The present invention also includes special adapters that also accommodate cleat designs produced and sold by the SPEEDPLAY Company of San Diego, Calif. and in particular their cleat designs known as SPEEDPLAY X-Pedal (generic term is a road style pedal) and SPEEDPLAY Frog (generic term is a mountain style pedal). By this combination of flip-flop pedal and adapters, bicycles and mainly spin-bikes fitted with the invention can accommodate a very large majority of cyclists and shoe cleat designs.

In the art there is a special pedal adapter sold by a manufacturer called INSTEP (road) that fits onto both a LOOK (road) and an SPD (mountain) style pedal. The INSTEP (road) brand adapter is made by Winwood Company of Denver, Colo. Thus a cyclist wearing running shoes which do not have any bicycle shoe type sole cleats, can lock his running shoe into place on the INSTEP (road) adapter which in turn is mounted on a spin bike with a LOOK (road) style pedal. In this manner, a cyclist wearing running shoes can use a stationary spin bike, which are fitted with LOOK or SPD style pedals (road or mountain). This INSTEP (road) adapter is an attempt to address part of the problem discussed above, but does not take it to the level of invention described in the present application. Further, the INSTEP (road) adapter is essentially a toe-strap design and so represents a step backwards to the early unsatisfactory toe-strap designs used on bicycles many years ago.

FIG. 8a is a prior art top plan view of a standard LOOK (road) style shoe cleat that is attached to the sole of a cyclist's shoe. Three rectangular holes (221, 222, 223) are used to attach the cleat to the shoe sole (not shown). The top surface (288) of the shoe cleat is curved to fit the typical cycling shoe sole. All three rectangular holes have a recessed edge (227) which accommodates a rectangular washer (252 in FIG. 8b). One central rectangular hole (225) is used to hold a rubber bumper (not shown) which stops the cleat from rattling when loosely fitted to the sole of the cyclist's shoe. The front tongue (224) of the cleat fits under the front recess (202 in FIGS. 7a and 7b). The rear tongue (226) of the cleat fits under the spring-loaded retaining plate (204 in FIGS. 7a and 7b).

FIG. 8b is a prior art exploded and cross-sectional view taken along line 8b—8b of the standard LOOK (road) style shoe cleat shown in FIG. 8a. The front and rear tongues (224 and 226) are shown. Three retaining washers (252 only one is shown) fit in the recesses (227) shown in FIG. 8a. Three screws (250 only one is shown) hold the cleat in place on the cycling shoe (not shown) by passing through the washers (252) and through the cleat holes (221, 222, 223 in FIG. 8a) and engaging in threaded holes in the base of the cycling shoe (not shown).

FIG. 11 is a view of a prior art INSTEP LOOK (road) style Pedal Adapter. The adapter body (300) is similar in shape to a standard LOOK (road) style cleat (FIGS. 8a and 8b), with a front tongue (306) and a rear tongue (305) identical to the front and rear tongues of a LOOK (road) style cleat. Thus the INSTEP (road) adapter can be locked onto a LOOK (road) style pedal. The toe-straps (301) are connected to an arch strap (302) through a common connector plate (307). The arch strap (302) is attached to the adapter body (300) in an adjustable manner (not shown). The cyclist inserts his running shoe into the cage consisting of the toe-straps and the arch strap and the upper surface (308) of the adapter base (300), thus forming an attachment between his running shoe and the INSTEP (road) adapter, which in turn, is connected to the pedal.

Referring to FIG. 12, there is shown a prior art of a first conventional type bicycle pedal 500 which is known in the art as LOOK bicycle pedal. This first prior art bicycle pedal 500 includes a toe or first retaining section 501, a rear or second spring-loaded plate 502 and a threaded spindle connector 503 which is connected to the bicycle pedal crank (not shown). The toe retaining section 501 holds the front 224 of a prior art of a first conventional type shoe cleat (see FIG. 8a) while the rear spring-loaded plate 502 moves away from the body of the pedal when the first prior art shoe cleat is inserted and the rear spring-loaded plate snaps back to lock the shoe cleat on the pedal 500.

Referring to FIGS. 13 and 14, there is shown a prior art of a second conventional type bicycle pedal 504 which is known in the art as SPD bicycle pedal. This second prior art bicycle pedal 504 includes a front tongue recess 505, a rear tongue spring-loaded plate 506 and a threaded spindle connector 507 which is connected to the bicycle pedal crank (not shown). The spring-loaded retaining plate 506 is held in place by a winding spring 508 and secured to the body of the pedal 504 by a bolt 509. Referring to FIG. 23, a front tongue 512 of a second prior art type shoe cleat 510 is first inserted into the front tongue recess 505 and then the rear tongue 514 of the second prior art shoe cleat 510 pushes against the spring-loaded plate 506, causing the plate 506 to move away from the body of the pedal and once in place the spring-loaded retaining plate 506 moves back into position and securely locks the shoe cleat to the pedal 504.

Referring to FIG. 15, there is shown a prior art of a third conventional type bicycle pedal 516 which is known in the art as SPEEDPLAY "X" bicycle pedal. This second prior art bicycle pedal 516 includes a circular base 518, a metal bow-tie shaped plate 520 which is mounted to the base 518 and held by two screws 522, two grooves 524 located on opposites and parallel to a threaded spindle connector 526 which is connected to the bicycle pedal crank (not shown). Referring to FIG. 24, there is shown a prior art of a third conventional type shoe cleat 528 which correspondingly matches with the third prior art bicycle pedal 516. The shoe cleat 528 includes a circular shaped recess 530 which correspondingly matches the circular base 518 of the third prior art bicycle pedal 516 and two opposite parallel rods 532 almost extending the diameter of the recess 530. The third prior art shoe cleat is positioned onto of the third prior art bicycle pedal 516 such that the recess 530 encompass the base 518 and then the two parallel rods 532 engage with the two grooves 524 to secure the third prior art shoe cleat528 to the third prior art pedal 516.

Referring to FIG. 16, there is shown a prior art of a fourth conventional type bicycle pedal 534 which is known in the art as SPEEDPLAY frog bicycle pedal. This fourth prior art bicycle pedal 534 includes a circular metal ring 536 mounted and secured to a protruding base 538 by two screws 540, and a threaded spindle connector 537 which is connected to the bicycle pedal crank (not shown). A sloped ramp 542 is formed with the protruding base 538, which allows disengagement of the fourth prior art shoe cleat 544 shown in FIG. 25. When the cyclist rotates his or her shoe toward the bicycle's frame, two protruding lugs 546 on each side of the metal ring 536 are engaged by a pair of retaining flanges 548 to secure the fourth prior art shoe cleat 544 (see FIG. 25) thereto. A stopping flange 550 is also provided and engages with the sloped ramp 543 to stop the rotation of the fourth prior art shoe cleat 544, thereby fastening the fourth prior art shoe cleat to the fourth prior art bicycle pedal.

Referring to FIG. 17, there is shown a prior art of a fifth conventional type bicycle pedal 552 which is known in the art as BE-BOP bicycle pedal. This fifth prior art bicycle pedal 552 includes a pair of spaced apart opposite generally circular flanges 554 which form the attachment mechanism of the pedal, and a threaded spindle connector 547 which is connected to the bicycle pedal crank (not shown) and sandwiched between the circular flanges 554. Referring to FIG. 26, there is shown a prior art of a fifth conventional type shoe cleat 556 which correspondingly matches with the fifth prior art bicycle pedal 552. The shoe cleat 556 includes a circular shaped recess 558 which correspondingly matches with either one of the pair of circular flanges 554 of the fifth prior art bicycle pedal 552. The fifth prior art shoe cleat 552 is positioned onto of the fifth prior art bicycle pedal 516 such that the two opposite flanges 560 engage with the circular flange 554 of the fifth prior art bicycle pedal to secure the fifth prior art shoe cleat 556 to the fifth prior art pedal 552.

SUMMARY OF THE INVENTION

The present invention is a method and device for improving the fitting of a cyclist to a bicycle which takes into account key aspects of the physiology of the cyclist's body and in particular certain intrinsic structural relationships of the human foot and knee, which invention and method when applied to the fitting of a cyclist on a bicycle results primarily in improved comfort of the cyclist and a reduction in fatigue while cycling.

Tests have also shown that the cyclist, when fitted to his bicycle using the present invention, experiences a reduction in oxygen consumption and a decrease in heart rate while pedaling at a submaximal level and an increase in power applied to the pedals.

The present invention addresses the problem of fitting in a new way. It starts with the position of the cyclist's foot on the pedals and works up the legs to the torso and the hands. The present invention focuses first on the fitting (or positioning) of the cyclist's foot, which is the point where power is applied to the bicycle pedal by the cyclist. An object and advantage of the present invention compared to the current art is the addition of carefully selected wedges to the base of the cyclists shoe, generally under the cleat, which rotates the shoe to match the natural varus or valgus condition of the cyclist's forefoot. This improvement along with better hand placement on the handlebars and the use of specially designed hand grips, has been found by testing to allow an increase in power applied by the cyclist to the pedals for the same amount of energy expended by the cyclist.

Further, the addition of these wedges removes the tendency for the cyclist's knee to move in a lateral direction, to one side then the other, as seen when viewing the cyclist from the front during a complete pedal rotation. Another object of the present invention is the removal of this lateral (sideways) deflections of the knee joint, or rotational knee movement, when viewed from in front of the cyclist, which reduces the sideways strain on muscles and tendons in the leg and foot which in turn reduces fatigue while cycling.

Another object and advantage of the present fitting invention is to lock the cyclist's shoe onto the pedal fitting device so that full power can be applied by the cyclist throughout the entire rotation of the pedals so that correct fitting measurements can be made. In the current art of pedal mounted devices which are used for fitting a cyclist to a bicycle, the cleat of the cyclist's shoe sits inside an open cavity on the top of the device, designed such that the cyclist cannot apply any upward force or apply full power to the pedal through the cleat, otherwise the cleat comes out of engagement with the pedal mounted device. The present invention locks the cleat onto the pedal mounted device in a manner that simulates an actual locked cleat/pedal condition.

Another object of the present invention is to avoid the overuse and asymmetric muscular development that occurs when the cyclist's forefoot is forced into a flat position in relation to the pedal as occurs in the current art. When the forefoot is forced into the flat position, the cyclist's knee is pulled in or out of alignment which also causes the patella to be pulled, resulting in over development of the muscles attached to the patella, such as the vastus lateralus muscle on the outside of the cyclist's leg, and underdevelopment of the vastus medialus muscle on the inside of the leg.

A measurement has been made of the amount of lateral or sideways movement that occurs in a knee when cycling with a flat forefoot condition as is the current standard in the art. The knee's sideways movement was as much as 2 inches side to side. In a 50 mile distance with a cyclist pedaling at 82.5 rpm and a speed of 15 miles per hour, the knee actually travels an extra 12.5 miles side to side.

Significant inertial forces are also created in the leg of the cyclist by the misaligned forefoot, which then continuously changes the horizontal location of the cyclist's knee during the pedal rotation. The extra energy required to supply this motion is considerable when compared with a knee which is moving in the vertical direction only, with no sideways motion.

It is another object and advantage of the present invention to minimize this wasted energy by adding wedges under the cyclist's shoe such that the inside sole of the cyclist's shoe is at the same angle as his natural forefoot angle or cant thus eliminating unnecessary horizontal movement of the knee.

Another object and advantage of the present invention is the adjustment of the cyclist's shoe to account for the forefoot cant angle, which spreads the pressure generated on the sole of the cyclist's foot when force is applied to the pedal through the sole of the shoe and the cleat in a more optimum and natural manner. The metatarsal heads of the 5 digits will have the correct distribution of load.

If the forefoot is forced into the flat position, as in the current art, there is already a misalignment of force applied to the foot sole through the metatarsal heads, or the balls of the foot, which can cause pain and discomfort in the outer portion of the foot. Cyclists who have been fitted with the current art devices which create a flattened forefeet condition on the pedal had previously reported their feet 'going to sleep' during cycling. When fitted according to the method of the present invention, cyclists have reported greatly improved feet conditions during and after a race.

The invention also measures and corrects for the natural angle that exists between the heel and forepart of the human foot in the neutral or relaxed position by the use of angled wedges positioned under the sole of the cyclist's shoe, thus holding the foot on the pedals in a neutral, relaxed position. This correction reduces the lateral or side-to-side motion of the cyclist's knee or patella when cycling. This reduced side-to-side motion of the knee, and correspondingly reduced rotation of the tibia, contributes to a reduction in fatigue and also reduced oxygen consumption by the cyclist.

The invention also results in increased power applied by the cyclist to the bicycle pedal, thus improving his cycling performance.

Proper fitting allows cyclists to be more comfortable, have better energy conservation, perform up to their potential and prevent the overuse injuries to their bodies that can result from poor fitting of the cyclist to the bicycle.

Some of the many advantages of the present invention when used on exercise bikes and other cycling equipment are:

(a) it includes a stronger spindle that greatly reduces the frequency of breakage that commonly occurs on stationary exercise or spin bikes.

(b) it allows the immediate use of an exercise bike by the majority of cyclists who wear shoe cleats made by LOOK (road style pedal), SPD (mountain style pedal) and SPEEDPLAY X-pedal (road style pedal) or SPEEDPLAY Frog (mountain style pedal).

(c) exercise clubs do not have to inventory a wide variety of pedals for their exercise bikes to meet the needs of their clients.

(d) exercise clubs can standardize their exercise bikes to one type of pedal design which will now fit the largest majority of rider's bicycle shoes.

(e) the rider can wear his favorite cycling shoes and cleat type, while exercising in the gym without having to change anything.

(f) the rider does not have to carry a pedal wrench and spare pedals to the gym when he goes to exercise on the gym's exercise bikes.

(g) the rider does not have to change the pedals on the gym's exercise bike to fit his shoe cleats before he can ride the exercise bike.

(h) sports and exercise clubs can offer a wide combination of pedal/cleat designs on all their exercise bikes, while fitting all of their bikes with only the flip-flop pedals and adapters of the present invention.

(i) the frequency of breakage of pedal spindles is reduced when the invention is used on exercise bikes.

(j) the sports club does not have to carry such a large inventory of spare pedals in the event of breakage of pedal spindles.

(k) maintenance of exercise bikes is reduced due to the more reliable pedal-spindles of the invention.

(l) the risk of liability to the sports club is reduced due to the reduction of injuries associated with breakage of the pedal spindles.

(m) it allows the sports club to advertise their bikes to a broader range of public.

(n) it reduces the occurrence of pedal crank-thread stripping on exercise bikes in gyms, which is caused by too frequent change of pedals by various riders.

(o) individuals may purchase their own flip-flop pedals and adapters and bring them for use at an exercise club which has not purchased these pedals for their exercise bikes, and so individuals can exercise wearing their own preferred cycle shoes.

Accordingly, it can be seen that the pedal and pedal adapters of the present invention can accommodate a wide variety of the bicycle shoe sole cleats in use today. By accommodating the use of bicycle shoes fitted with LOOK (road), SPD (mountain), SPEEDPLAY (road) X-Pedal and SPEEDPLAY (mountain) Frog shoe cleats, the invention covers about 95% of all of the cleat designs presently in use on spin bikes and on road bikes. In addition, use of the invention will allow exercise clubs to offer their clients a wide variety of options in pedal/shoe cleats so that they can use their favorite shoes at the gym without having to change their shoes or the cleats that are already on their shoes. The invention will allow the exercise clubs to minimize costs, as they will no longer have to purchase a variety of extra pedals not offered by individual manufacturers.

Although the invention disclosed above contains many specifics, these should not be construed as limiting the scope of the invention but as merely providing illustrations of some of the presently preferred embodiments of the invention. For example, the flip-flop pedal can have other shapes, as long as the connecting surfaces are compatible with LOOK (road) and SPD (mountain). Also, the adapter plates to accommodate the two types of SPEEDPLAY (road) pedal cleats can also be designed to fit onto an SPD (mountain) style pedal rather than the preferred LOOK (road) style pedal, etc. Thus the scope of the invention should be determined by the appended claims and their legal equivalents, rather than by the limitations suggested in the examples given.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 8a is a prior art, showing a top view of a standard LOOK (road) style shoe cleat.

FIG. 8b is a prior art exploded and partial cross-sectional view taken along line 8b—8b of FIG. 8a.

FIG. 9a is a top view of a SPEEDPLAY (road) X-Pedal cleat adapter.

FIG. 9b is a cross-sectional view taken along line 9b—9b of FIG. 9a.

FIG. 9c is a side view of a SPEEDPLAY (road) X-Pedal Cleat Adapter being fitted into the LOOK (road) style side of a flip-flop pedal.

DETAILED DESCRIPTION OF THE PREFERRED EMBODIMENTS

Figure 1:
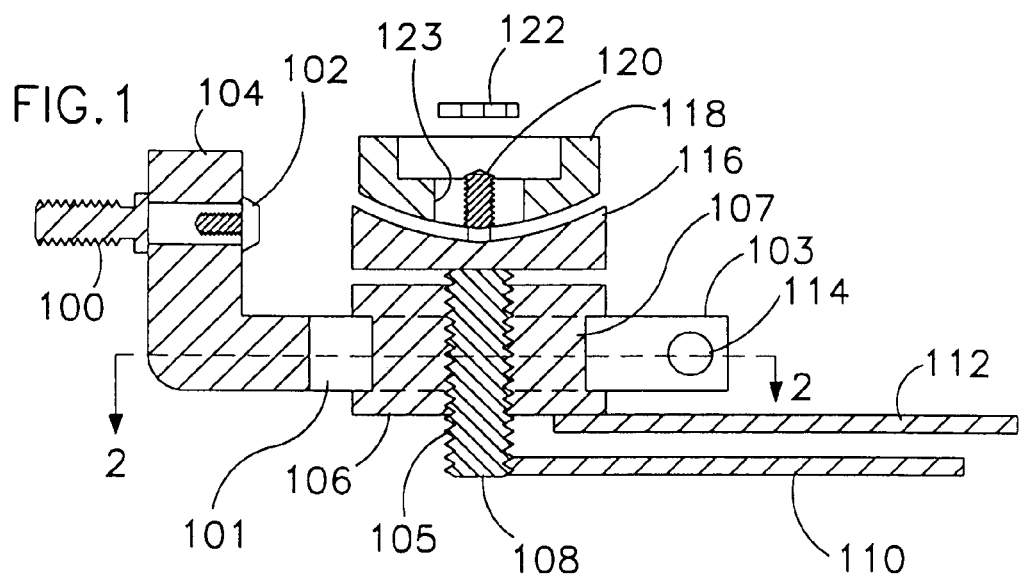
FIG. 1 is a cross-sectional view of a pedal fitting device.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The sport of cycling involves the interaction of a highly adaptable human body and a semi-adjustable mechanical device called a bicycle. The degree of fit between these two can have a profound effect on the performance of the body-bicycle combination. A common denominator of cyclists who enjoy and excel at the sport of cycling is an efficient fit between the body of the cyclist and their individual bicycle.

It is well known in the art of fitting a cyclist to a bicycle, that the lengths of various limbs and limb sections of the cyclist's body, his or her trunk dimensions, shoulder width, hand size and overall body flexibility and also the physical dimensions of the frame of the bicycle and the location of the seat, the handlebars and the pedals, must be fitted or matched together for the cyclist to achieve good performance and comfort while cycling. Injuries can still occur even with the present art of fitting and a painful knee condition known as chondromalacia patellae is still common among competitive cyclists as well as other overuse injuries. Overuse injuries are injuries caused by repetitive exertion of a body part when that body part is out of correct alignment as occurs using standard pedals and cleats.

Proper fitting allows the cyclist to be more comfortable, have better energy conservation, perform up to their potential and prevent overuse injuries to their bodies that can result from poor fitting of the cyclist to the bicycle.

The present invention takes the art of fitting a cyclist to a bicycle to a more advanced level, whereby certain key aspects of the physiology of the foot of the human body are also addressed during the fitting procedure, as well as proper hand placement on the handlebars and the shape and placement of the hand grip used. These additional fitting factors result in noticeably improved comfort for the cyclist and in measurable improvements in the application of power to the pedal of the bicycle and reduced fatigue, when compared to the present art.

In an experiment with 5 cyclists at the University of Auburn, using the present invention and method a power increase average of 2% was measured. This is a very significant increase in power as one skilled in the art of cycling knows and can make a very significant difference in a cyclist's time during a race or contest.

The key aspect of the physiology of the human foot that is integrated into the present invention and which is not known in the art, is the fact that about 93% of cyclists have a distinct angular displacement, or cant, of the forefoot in relation to the heel, when the forefoot is in its neutral or most stable, relaxed position. In 87% of cyclists, this angular displacement or cant of the forefoot is toward the outside of the forefoot (called "forefoot varus") and in 6% of the study group, the displacement angle is towards the inside of the forefoot or forefoot valgus. In only 4% of cyclists, the displacement angle or cant is essentially zero.

Up until now, the fitting methods used for cyclists and their bicycles have been based on a number of standard measurements, none of which took into account this aforementioned cant angle of the forefoot or the placement of the hands, grip shape and placement on the handlebars. These current fitting methods use devices which attach onto standard pedal spindles, to steer tubes and to handlebars, and these devices allow adjustment of certain key dimensions of the cyclist's bicycle in relation to certain dimensions of the cyclist's body.

For example, the bicycle pedal-to-seat dimension in the vertical and axial fore and aft planes must be adjusted to the cyclist's leg length and his trunk position must be taken into account when selecting the handlebars' vertical and lateral positions. It is well known in the art that there is an optimum angle between the femur and the tibia of the cyclist's leg and this angle should be in the range of 25 to 35 degrees of flexure from the straight position, measured when the pedal is in the lowest or bottom-dead-center position.

If the distance from the seat in relation to the pedal at its lowest position is too short, this leg angle is more than 35 degrees, causing the cyclist's knee to be flexed too much at the point of highest force in the pedal stroke, thus generating excessive pressure across the patellofemoral joint. Note that the seat should be parallel to the top tube of the bicycle frame when establishing the correct leg angle.

In the fitting of the cyclist's foot position, the currently existing fitting methods used in the art are limited in scope and adjust the cyclist's shoe toe-in or toe-out position by rotation of the cycling shoe cleat and/or move the position of the cleat fore and aft on the shoe sole. Also, no adjustment for hand position or hand grip shape was used, only a tube shaped bar is used and no other factor is addressed. Improper hand placement can cause discomfort in the wrist, which translates through the arm up to the shoulders and neck, causing excessive discomfort and fatigue in these areas.

No allowance is made in the art for the natural varus or valgus of the forefoot described above and the shoe is locked in the flat position onto the pedal. This causes the subtalar joint between the foot and the ankle which acts as a torque converter to transform the rolling motion of the forefoot into a vertical rotation of the leg, imparting a torque stress to the knee joint, which in turn pulls the knee out of its correct position.

FIG. 1 is a cross-sectional view of the pedal device with a pedal spindle bolt (100) connected to a tuning fork (104) by a retaining bolt (102). The tuning fork holds an anchor (106) which has two parallel slots that slide along the inside surfaces (101) of the arms (103) of the tuning fork. Through the center of the anchor is a threaded hole (105) through which threads onto the connecting bolt (108) of the saddle plate (116). An angle indicator (110) is connected to the side of the connecting bolt (108). Above the saddle plate is a cleat adapter (118) connected to the saddle plate (116) by a threaded stud (120) and a nut (122). The cyclist's cleat height is adjusted by turning the connecting bolt (108) to achieve the desired height of the cleat adapter (118). The amount of cant required is set by moving the cleat adapter (118) back and forth in the slot (123) in the cleat adapter. The pedal width is set by sliding the anchor slots (107) along the tuning fork arms (103) until the correct width is established, then locking the position in the tuning fork arms by tightening the retaining bolt through the bolt holes (114). The cyclist's toe-in toe-out position is measured by checking the angle between the indicator (110) and the angle plate (112).

Figure 2:
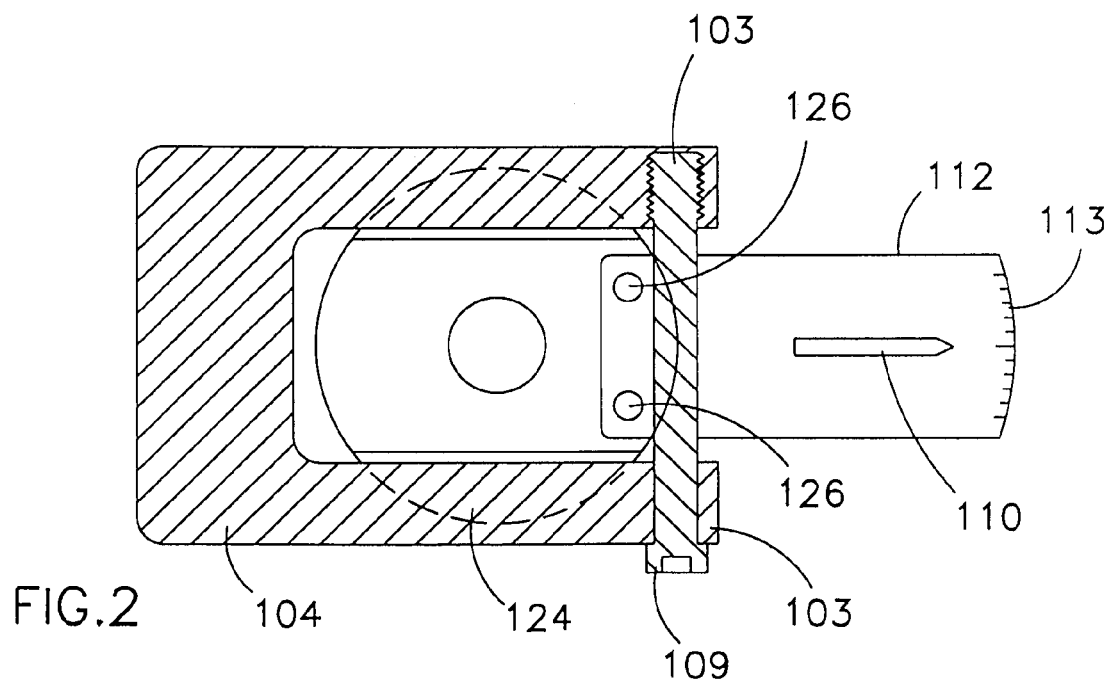
FIG. 2 is a cross-sectional view taken along line 2—2 of FIG. 1.

FIG. 2 is a cross-sectional view take along line 2—2 of the pedal device illustrated in FIG. 1. The angles (113) on the plastic see-through angle plate (112) are in one degree increments. Details of the slot (124) can be seen sliding on the tuning fork arms (103). The locking bolt (109) fixes the position of the pedal width dimension.

Figure 3:
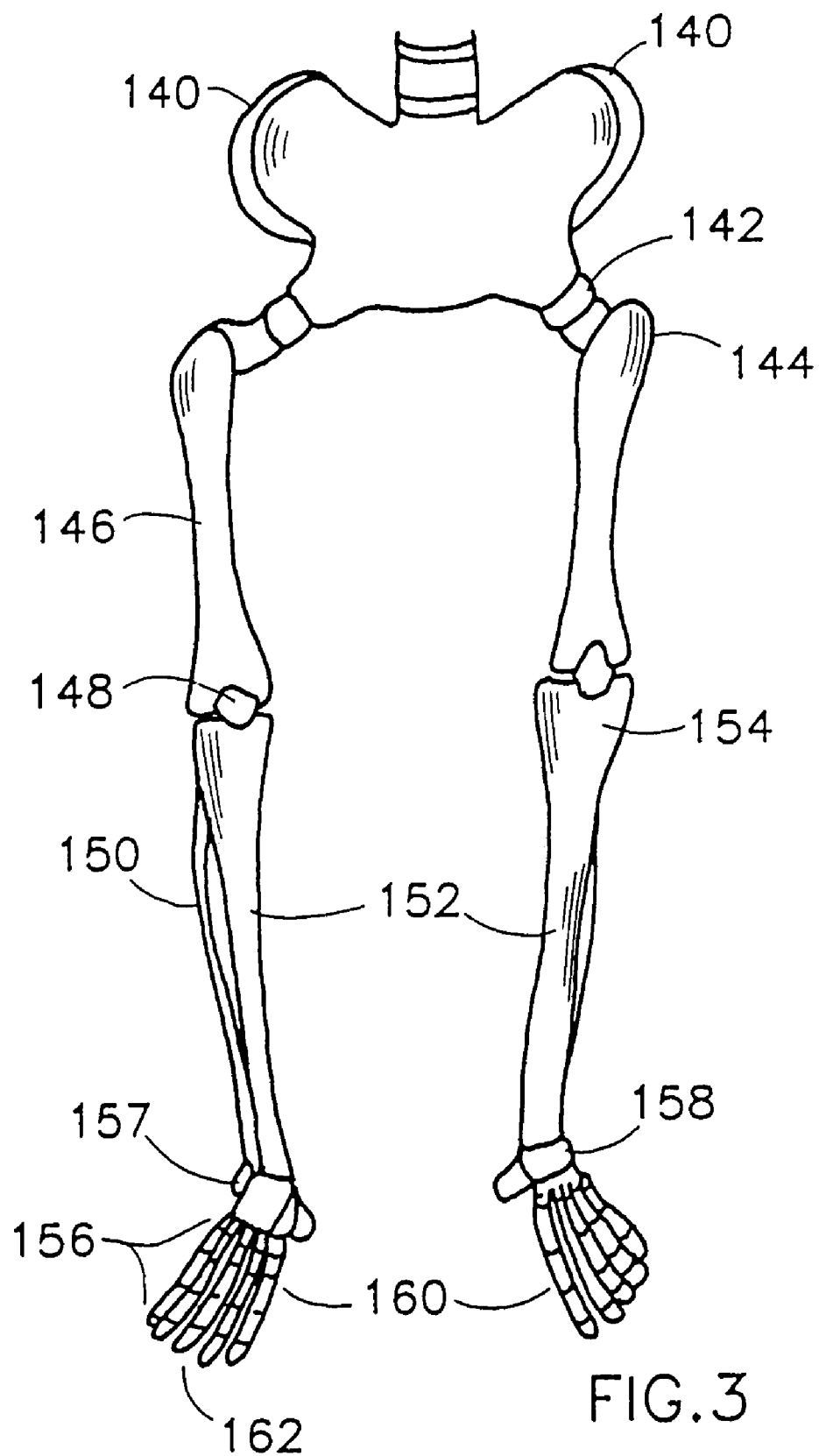
FIG. 3 is a skeletal section of the cyclist's lower body.

FIG. 3 shows the location of the various points in the legs that are referenced in the application. The pelvis point (140) is shown as well as the greater trochanter (146), the hip joint (142), the femur (146), the patella (148), the tibial tuberosity (154), the fibula (150), the tibia (152), the subtalar joint (158), the metatarsal heads (160), the forefoot (156) and the second toe (162). These points are used at various stages in the fitting method.

Figure 4A:
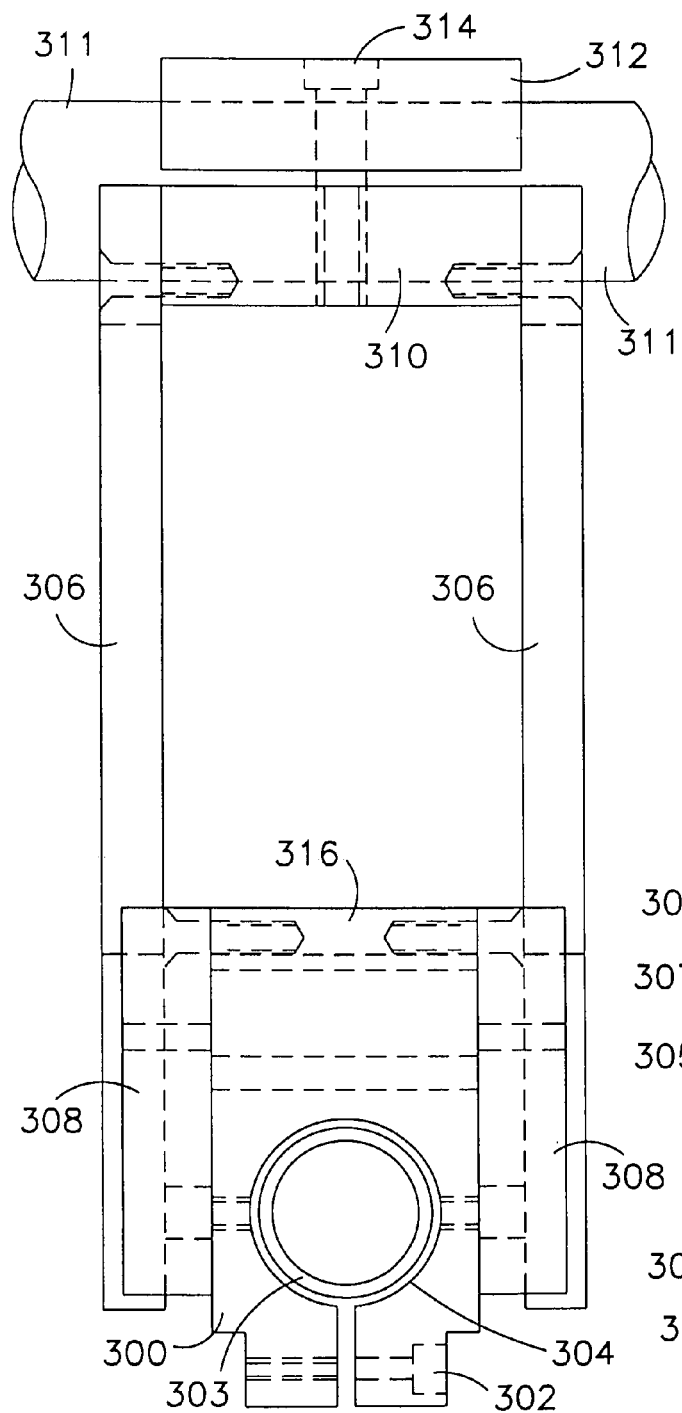
FIG. 4a is a top view of a handle bar fitting device.

FIG. 4a shows a top view of a handle bar fitting device consisting of a quill clamp (300) with a quill clamp retaining bolt hole (302), into which is inserted a bolt (not shown). The bolt is tightened to hold the device on the quill shaft of the bicycle. A pivot bolt hole (304) is lined up with the center of the quill (303) and allows the device to pivot up and down (311). The reach of the bars is set by moving the side plates (306) fore and aft in the grooves in the side pivot plates (308). A spacing plate (316) maintains the assembly of the device.

Figure 4B:
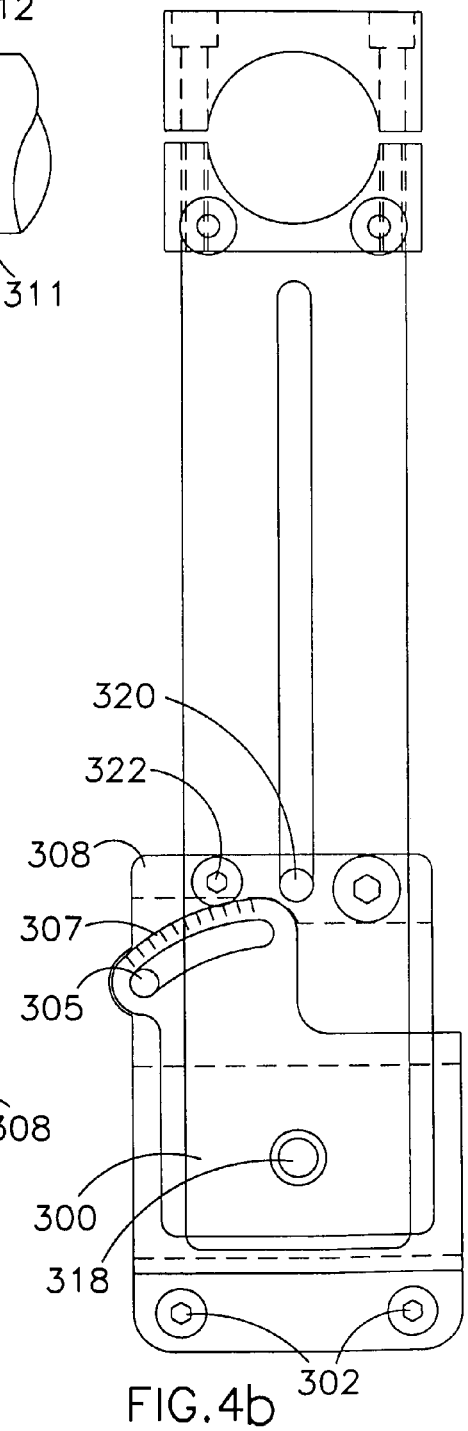
FIG. 4b is a side view of a handle bar fitting device.

FIG. 4b shows a side view of the handle bar fitting device showing the fore-and-aft adjustment bolt (320) which locks the position once found. The side pivot plates (300) have an angle measuring feature consisting of a locking pin (305) and an angle extension (307) which can be adjusted to set the correct angle of the handlebars. An angle pivot bolt (318) allows adjustment of the angle of the side plates (306) and locks it to the correct setting.

Figure 5A:
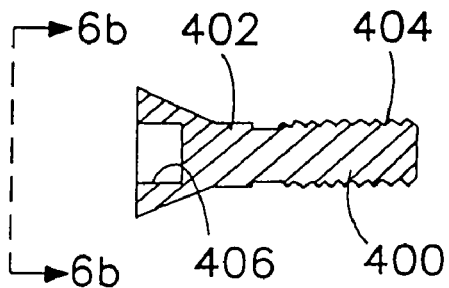
FIGS. 5a and 5b show views of a modified Allen head screw for securing cleats.
Figure 5B:

FIGS. 5a and 5b show details of the special cleat retaining screw (400) consisting of an Allen-head socket (408) and a shoulder section (402) which allows deeper penetration of the Allen-head cavity (406). The threaded section (404) is a standard length. The addition of the shoulder (402) allows a deeper engagement Allen-head socket space which improves engagement of the Allen-head socket lever (not shown) and removes the tendency of the standard industry Allen-head screw to strip the socket when it is tightened in place.

Figure 6A:
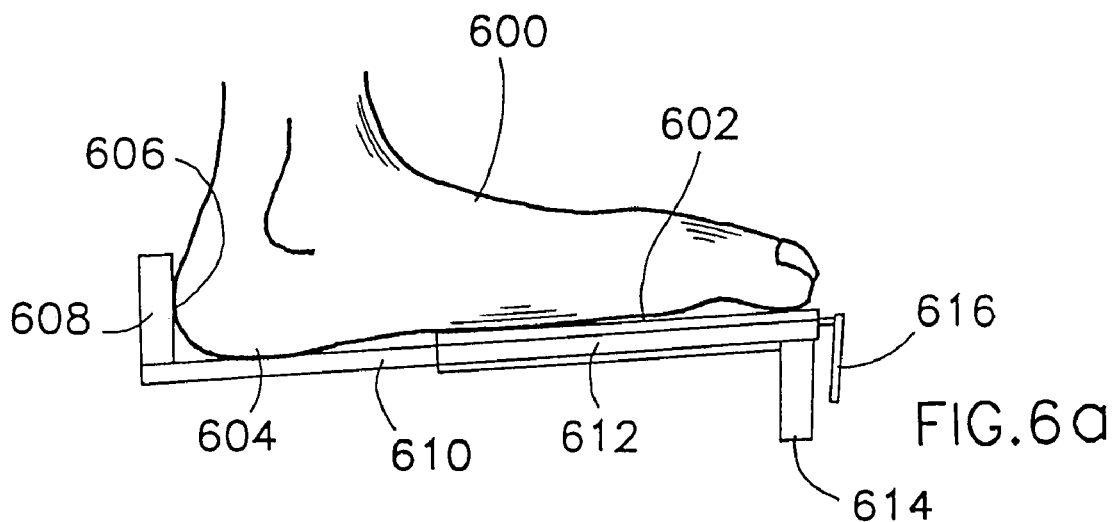
FIG. 6a shows a side view of a device for measuring the foot cant angle.

FIG. 6a shows a cyclist's foot (600) positioned on top of a cant angle measuring device (610). The heel (606) of the foot is placed against a back plate (608) and the heel base (604) rests on the top of the device as well as the forefoot (602). The rotation tube (612) of the device allows the angle indicator (616) to move relative to the heel tube (610) as it follows the varus or valgus rotation of the cyclist's foot. The cant angle is indicated to the nearest degree on the angle plate (614).

Figure 6B:
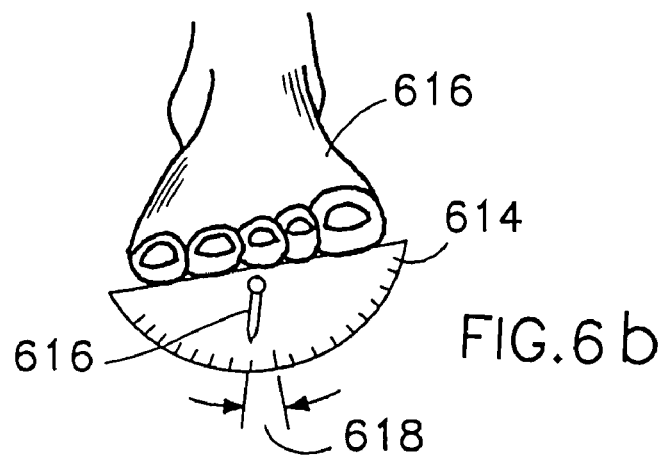
FIG. 6b shows a front view of a device for measuring the foot cant angle.

FIG. 6b shows a front view of the cant angle measuring device and shows the forefoot rotation (618) and the indicator (616) and the relative angle (618) which is the cant angle of the foot.

The embodiments described above are only one possible example and the invention is not limited to the ones described above and many other variations are possible which will carry out the intent of the invention and method described herein.

The present invention is not limited to general recreational cycling as described in earlier sections but this type of application was selected to clearly define the invention using one of the many applications. There are many types of bicycles and types of use and all can benefit from the application of the present invention.

For example, the present invention can be applied with benefit to any sports activity, exercise routine, including weightlifting, aerobics, exercise machine and the like, by proper fitting of the shoe and placement of the hands.

Further, although the invention as presented addresses the needs of a recreational cyclist, the invention is equally applicable with minor modifications to the special needs of a variety of styles of bicycles and their use. Some of these specialty applications are triathlete and duathlete events in which because cycling is only a portion of the whole event and the cyclist has to perform another strenuous act immediately after cycling, the balance of the values of the various fitting parameters and measurements must be carefully taken into account.

Similarly in the case of track pursuit, or any time trial event, spin bike or indoor bike events, downhill mountain bike and BMX or bicycle motocross events, the special needs of each of these types of use can be better optimized by use of the present invention.

For instance, in triathlon events, the cyclist sits with his or her hips rolled forward as measured by a point on the greater trochanter and a point on the pelvis, placing the upper body in a more horizontal position. In fact the optimum position of the upper body is within (4–7) inches from the horizontal as measured from a line through the pelvis point and the shoulder socket.

Additionally, special aerobars are added to the handlebars with and without elbow support and the seat height is adjusted to alter the leg angle from the (25–35) degree optimum used for the general cyclist. Further, the seat is moved forward for the triathlete, to achieve a more aerodynamic shape of the cyclist's body in order to minimize drag. The plumb bob described earlier also hangs (1–4) inches ahead of the pedal spindle center line instead of passing through the spindle center.

In the case of time trial events, the measurements are the same as for a triathlete except that the upper body position is in the (2–4) inch range, the plumb bob is set (1–2) inches forward and the seat is set further forward to help minimize aerodynamic drag. Wind tunnel tests have found that aerodynamic drag is minimized when a plumb line is placed so that it bisects the cyclist's ear, passes down through the vee formed on the upper side of his elbow and when this vee and the base of the cyclist's hands on the handlebars are in a horizontal line.

In the case of pursuit events, the upper body shoulder is set (-1 to 2) inches above the hip or pelvis point.

In the case of spin bikes the leg angle is set on the (25–40) degree range and seat and handlebar settings are selected to position the upper body generally a lot higher than the general cyclist. The flip-flop pedal device described earlier can be used to great advantage in this application since it reduces the number of pedals that must be made available to fit the individual cyclist. Since one bicycle is used by many cyclists, with different cleat designs on their shoes, the flip-flop pedal device, being LOOK (road) and SPD (mountain) compatible, greatly reduces the number of pedal changes needed to service this type of public.

In the case of BMX bikes, the fitting allows for proper sizing of the bike for handling under the extreme terrain conditions and use of the bike that occurs in this type of event.

In the case of downhill mountain bikes, the seat is generally set lower to lower the center of gravity and improve bike maneuverability and control. Adjustments are also made to improve aerodynamics of the bike/cyclist system.

The method and devices for fitting a cyclist to a bicycle described herein are compatible with all current manufactured pedal/cleat systems in use today, such as all LOOK (road), SPD (mountain), TIME and SPEEDWAY (road) compatible systems to name a few as well as the traditional toe-clip (basket) and strap design and platform pedals.

The present invention is an improvement on an earlier flip-flop pedal design, initially disclosed in the inventor's prior application Ser. No. 08/923,022. The flip-flop pedal disclosed therein, has one side of the pedal surface constructed to match a LOOK (road) type or style of shoe cleat and the other side of the pedal surface constructed to match an SPD (mountain) type or style of shoe cleat.

There are two added features to the invention as part of this continuation-in-part, which accommodate two other pedal/cleat designs developed and sold by the SPEEDPLAY Company, called the SPEEDPLAY (road) X-Pedal and SPEEDPLAY (mountain) Frog Pedal. The SPEEDPLAY (road) types of clip-less bicycle cleat/pedal design variations are similar in operation to LOOK (road) and SPD (mountain), but have their own unique design and operational features and are also in common use today by cyclists. The flip-flop pedal and two extra adapter features to accommodate the two SPEEDPLAY (road/mountain) cleat designs are illustrated in the Figures and described in detail.

The first of the extra features of the present invention is an adapter plate that attaches to a LOOK (road) style pedal. This first adapter feature allows the cyclist to exercise on a bicycle fitted with either a set of LOOK (road) style pedals or a bicycle fitted with the flip-flop pedals of the present invention, while using cycling shoes fitted with SPEEDPLAY (road) X-pedal type cleats.

The second extra feature is another adapter plate that also attaches to a bicycle fitted with a LOOK (road) style pedal. This second adapter feature allows the cyclist to exercise on a bicycle fitted with a set of LOOK (road) style pedals or a bicycle fitted with the flip-flop pedals of the present invention, while using cycling shoes fitted with SPEEDPLAY (mountain) Frog Pedal type cleats.

When either of the two adapters and/or the flip-flop pedals of the present invention are fitted to a bicycle, the majority of cyclists can immediately use the bike as it can now accommodate such a wide variety of shoe cleats. Thus the rider of an exercise bike fitted with the flip-flop pedals and with the two adapter plates available does not have to change the pedals on the exercise bike nor carry bicycle shoes with different cleats than the ones that he normally uses on his own outdoor bicycle. Use of the flip-flop pedals and the two adapters can accommodate the three most popular cleat/pedal combination designs used by cyclists today, namely LOOK (road), SPD (mountain) and both types of SPEEDPLAY (road/mountain), namely the X-Pedal and the Frog pedal.

The flip-flop pedals and adapters are not limited in use to exercise bikes but can also be used beneficially on a road bike. For instance, in a bicycle race when a bike crashes and cannot be used, the rider can quickly get onto a spare bike fitted with flip-flop pedals, and continue in the race with a minimum of wasted time no matter what cleats he has on his shoes.

The present invention also addresses the spindle-breaking problem by incorporating a spindle with a larger diameter, thus lowering the stresses imposed on the spindle by the rider on a stationary bike. This stronger spindle will greatly increase the service life of the pedal on the spin bikes used in gyms and exercise clubs.

Figure 7A:
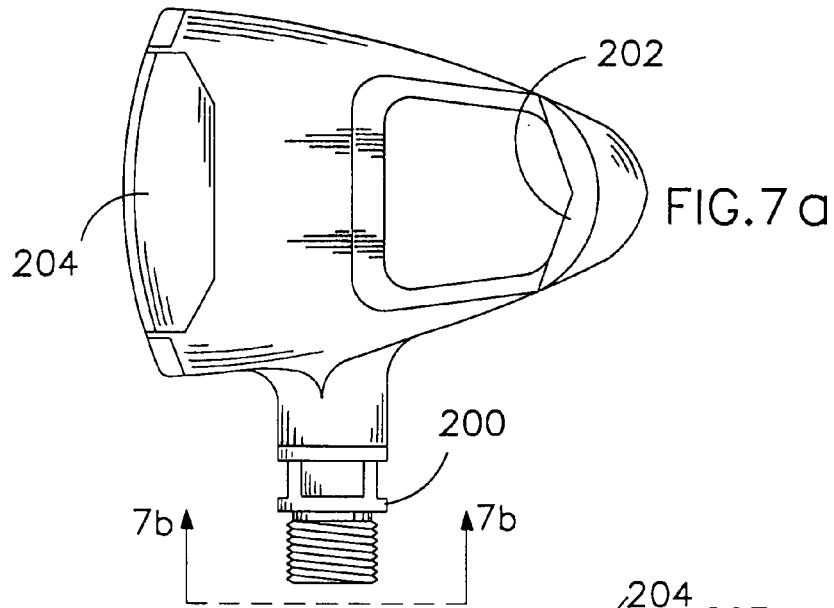
FIG. 7a is a top view of a LOOK/SPD (road/mountain) flip-flop pedal.

FIG. 7a is a top view of the LOOK/SPD (road/mountain) flip-flop pedal of the present invention. The top side of the flip-flop pedal is the LOOK (road) style pedal side. This top view shows the front recess (202) that accommodates the front tongue of a LOOK (road) style shoe cleat (224 in FIG. 8a) and the spring-loaded retaining plate (204) that locks in the rear tongue of the LOOK (road) style shoe cleat (226 of FIG. 8a). The threaded pedal spindle (200) attaches the pedal to a bicycle pedal crank (not shown).

Figure 7B:
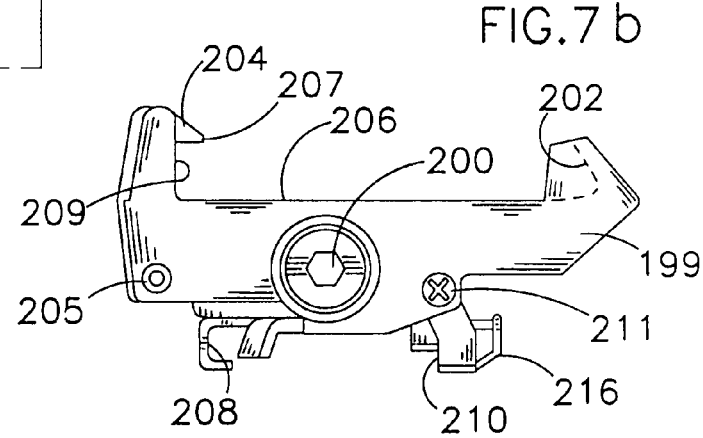
FIG. 7b is a side view of a LOOK/SPD (road/mountain) flip-flop pedal.

FIG. 7b is a side view of a LOOK/SPD (road/mountain) flip-flop pedal, showing the LOOK (road) style side at the top and the SPD (mountain) style side at the bottom. In the case of the LOOK (road) style top side, the retaining plate (204) rotates around a bolt (205) connected to an internal spring (not shown) when force is applied at surface (207) by the shoe cleat rear tongue (226 in FIG. 8a). Once the rear of the shoe cleat falls inside the recess (209) the retaining plate (204) moves back into place, under the action of the spring, thus locking the shoe cleat to the LOOK (road) style pedal surface.

FIG. 7b also shows an SPD (mountain) style cleat attachment on the bottom side of the flip-flop pedal. The front tongue of an SPD (mountain) style shoe cleat (not shown) is first inserted into the locking feature (208), on the SPD (mountain) pedal body (199), then the rear part of the cleat (not shown) pushes against the spring loaded retaining plate (216), causing the plate to move back. The spring (not shown) is held in place by a bolt (211) mounted into the flip-flop pedal body (199). Then the rear of the SPD (mountain) style cleat engages the recess (210) in the rear retaining plate (216). Once in place, the spring-loaded retaining plate (216) moves forward and the cleat is locked tightly onto the flip-flop pedal body (199).

Figure 7C:
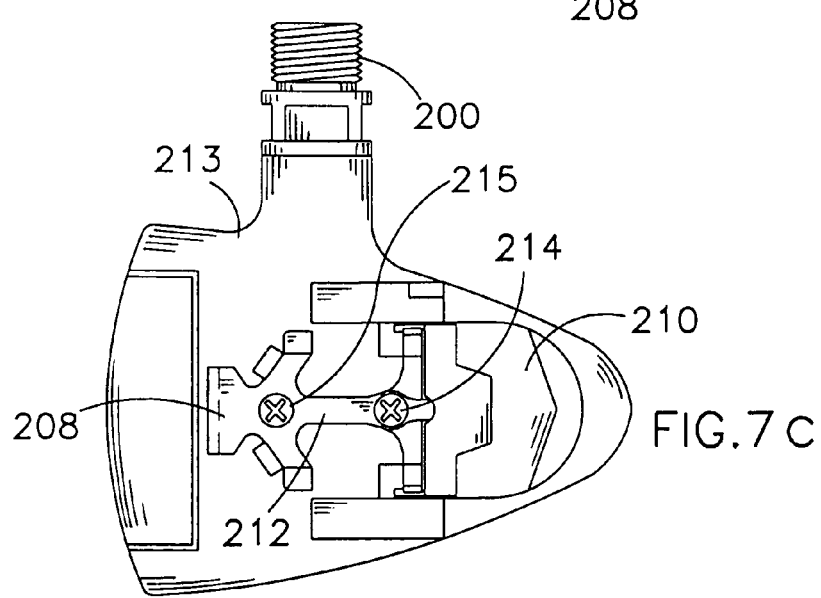
FIG. 7c is bottom view of a LOOK/SPD (road/mountain) flip-flop pedal.

FIG. 7c is a bottom view of the LOOK/SPD (road/mountain) flip-flop pedal showing more details of the SPD (mountain) style pedal. The retaining screws (214, 215) lock the SPD (mountain) style cleat base plate (212) onto the flip-flop pedal body (213).

Figure 8:
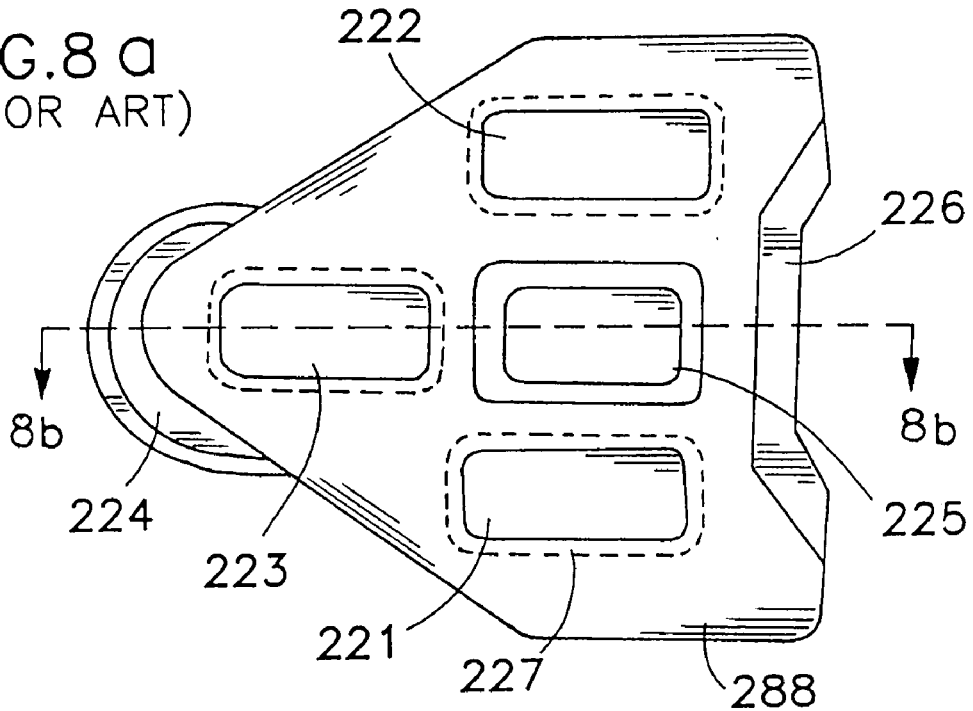
Figure 8:
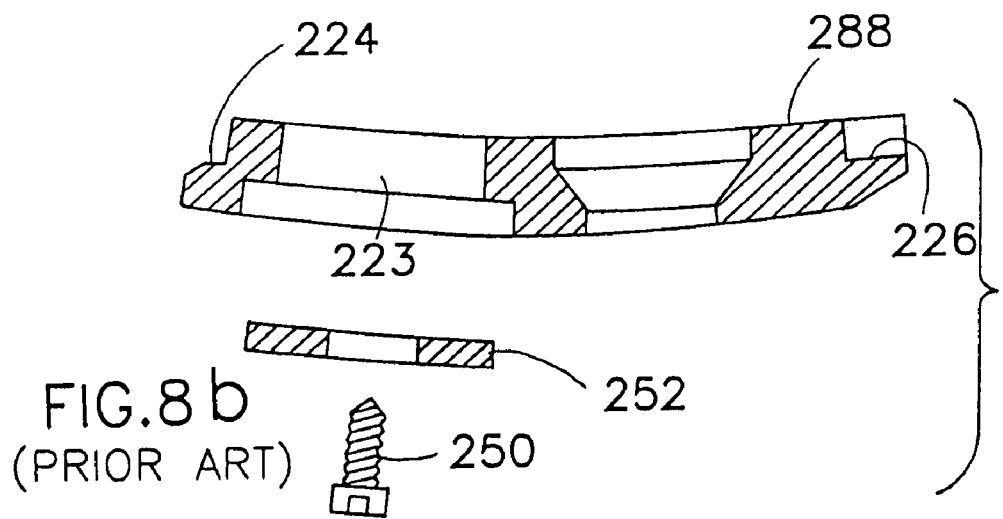

FIG. 9a is a top view the SPEEDPLAY (road) X-Pedal cleat adapter, which mounts onto the LOOK (road) side of the flip-flop pedal or onto a standard LOOK (road) style pedal. The standard SPEEDPLAY (road) X-Pedal has a 'bow tie' shaped plate (220). In this adapter, the bow tie shaped plate (220) is mounted on top of and integral with a LOOK (road) style cleat shape (229). The bow-tie plate is held in place by two screws (222). The adapter surface (221) and the two recesses (224 and 226) are identical to those on a standard LOOK (road) style cleat as shown in FIGS. 8a and 8b.

Figure 10A:
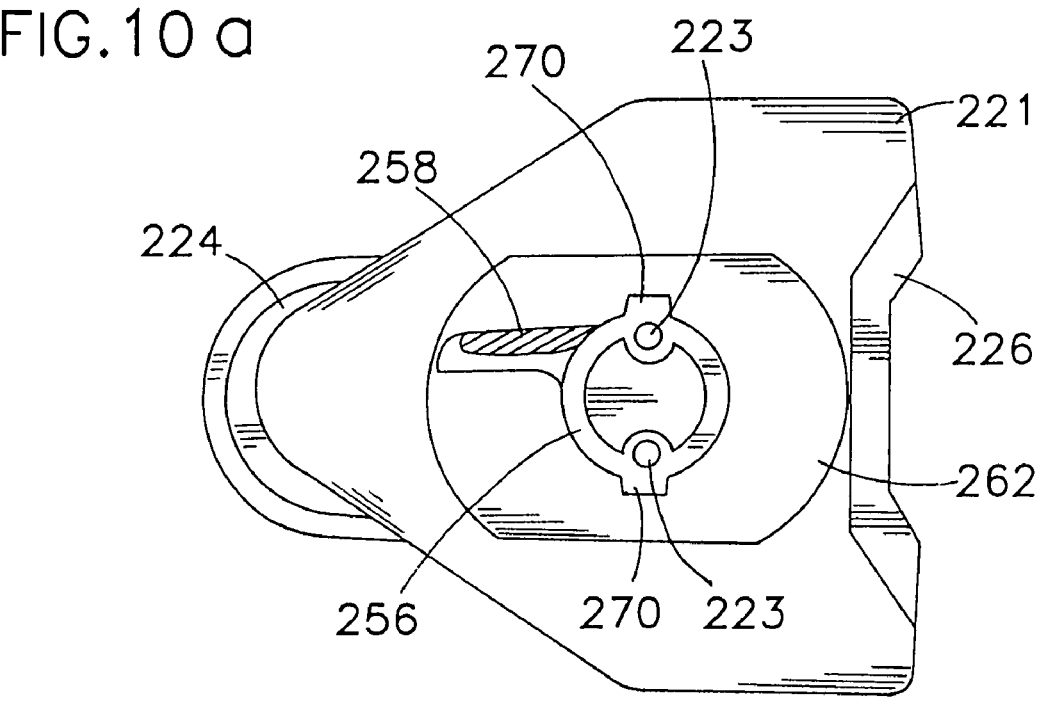
FIG. 10a is a top view of a SPEEDPLAY (mountain) Frog Cleat Adapter.

FIG. 9b is a cross-sectional view of the SPEEDPLAY (road) X-Pedal cleat adapter of FIG. 10a. The metal bow-tie plate (220) is held in place by two screws (230), which pass through the body of the adapter (231) and are fastened by two nuts (228). When the adapter is mounted onto the LOOK (road) side of the flip-flop pedal, a cyclist wearing a SPEEDPLAY (road) X-Pedal cleat on the sole of his cycling shoe can mount the bike and lock his cleats directly onto the top of the adapter, because the top shape and geometry of the adapter is identical to the top surface of a SPEEDPLAY (road) X-Pedal.

FIG. 9c is a side view of the SPEEDPLAY (road) X-Pedal Cleat Adapter (231) being fitted into the LOOK (road) style side of a flip-flop pedal. Details of the SPD (mountain) side of the flip-flop pedal are not shown for clarity. The front tongue (224 in FIG. 9a) of the adapter is first fitted into the recess (202) in the LOOK (road) style side of the flip-flop pedal and the rear section (226) is pushed down onto the spring loaded retaining plate (204). The spring (242) is held in place by a bolt (244) mounted into the body of the pedal. The downward force causes the retaining plate (204) to move backwards and thus allow the rear section of the adapter (231) to fall into the recess (240) and so be locked securely onto the flip-flop pedal.

FIG. 10a is a top of a SPEEDPLAY (mountain) Frog Cleat Adapter, which mounts onto the LOOK (road) side of the flip-flop pedal. A standard Frog (mountain) style pedal has a circular metal ring (256) with two threaded holes (223) which engages the Frog (mountain) style cleat. The top surface of the adapter (262) contains a sloped ramp (258), which allows disengagement of the Frog (moutain) style cleat (not shown), when the cyclist rotates his shoes toward the frame of the bicycle. The Frog (mountain) style pedal metal ring has two lugs (270) that protrude on each side of the metal ring and engage the Frog (mountain) style shoe cleats (not shown), thus fastening the cleats to the pedals.

Figure 10B:
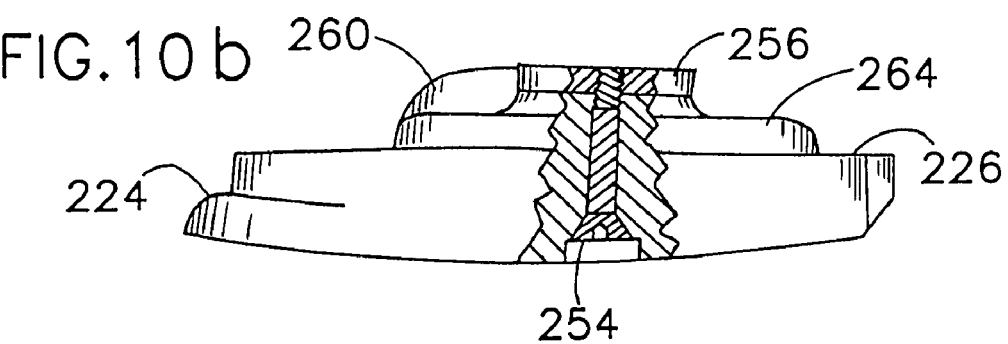
FIG. 10b is a side view partially sectioned of a SPEEDPLAY (mountain) Frog Cleat Adapter.
Figure 11:
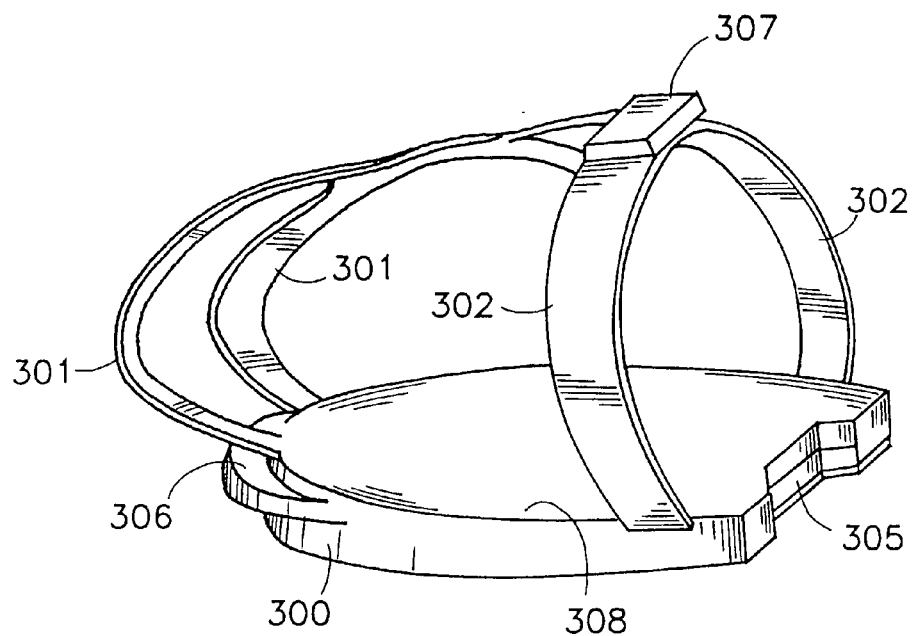
FIG. 11 is a perspective view of a prior art of a INSTEP LOOK (road) style Pedal Adapter.

FIG. 10b is a side view partially sectioned of a SPEEDPLAY Frog (mountain) Cleat Adapter. The front and rear tongues (224, 226) are shown. The retaining bolts (254) pass through the body of the adapter and engage and lock into the two threaded holes (223) in the Frog (mountain) style metal ring (256). The front ramp (258 in FIG. 10a) has a flat vertical side (260) that blocks the Frog (mountain) style shoe cleat, and stops it from disengaging, when the rider rotates his shoes away from the bicycle frame.

Described briefly, the present invention is a unique and novel flip-flop bicycle pedal that utilizes both sides of the pedal such that one side correspondingly matches with a prior art road type pedal configuration known in the art as LOOK pedal and the other side correspondingly matches with another prior art mountain type pedal configuration known in the art as SPD pedal. Alternatively, the present invention is a plurality of unique pedal adapters that utilize conventional type bicycle pedal configurations which complementary match a plurality of prior art bicycle shoe cleats known in the art as LOOK cleat, SPD cleat, SPEEDPLAY "X" cleat, SPEEDPLAY frog cleat, and BE-BOP cleat.

Figure 12:
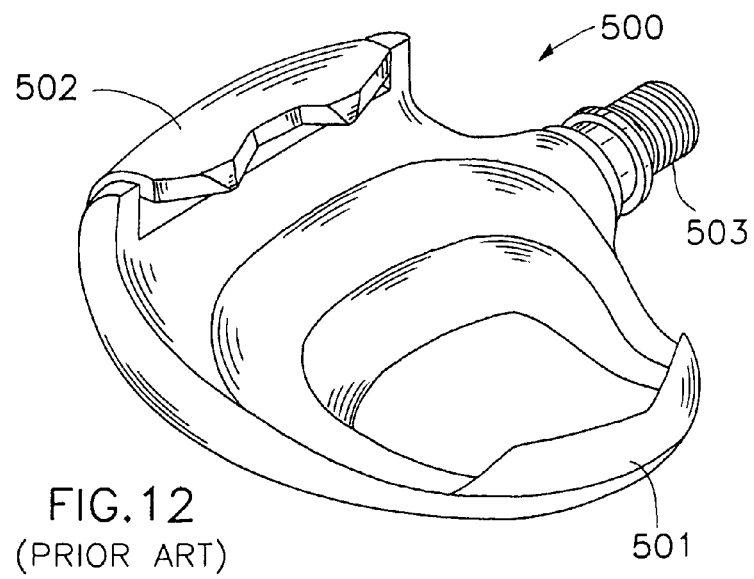
FIG. 12 is a perspective view of a prior art of a first conventional type bicycle pedal.
Figure 13:
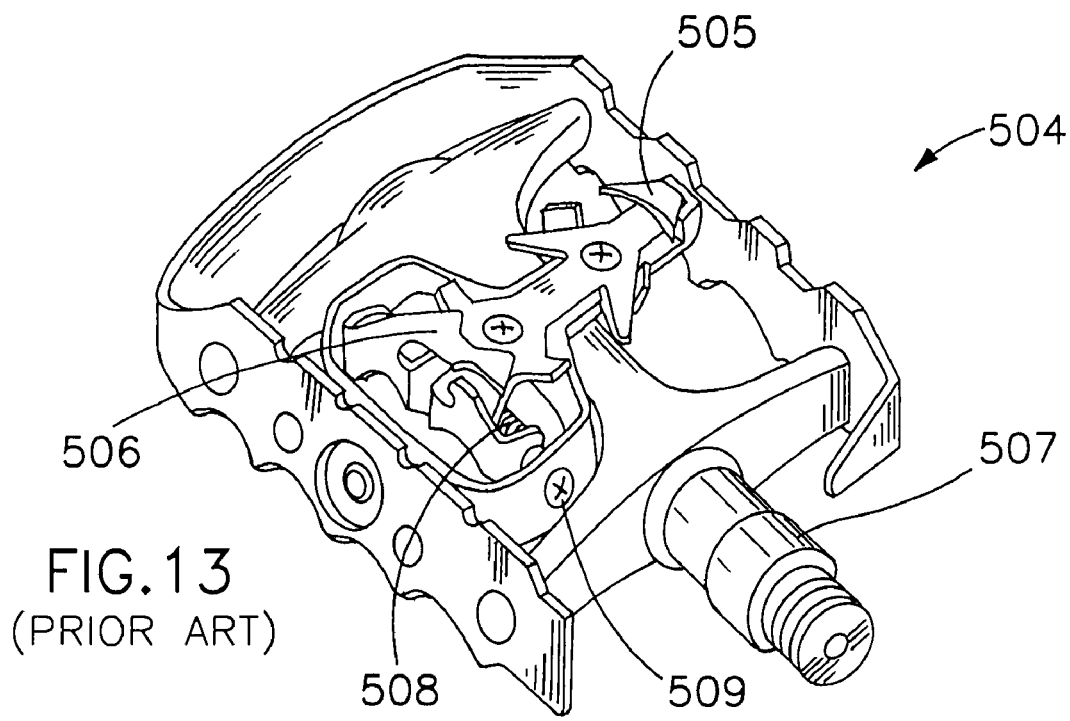
FIG. 13 is a perspective view of a prior art of a second conventional type bicycle pedal.
Figure 14:
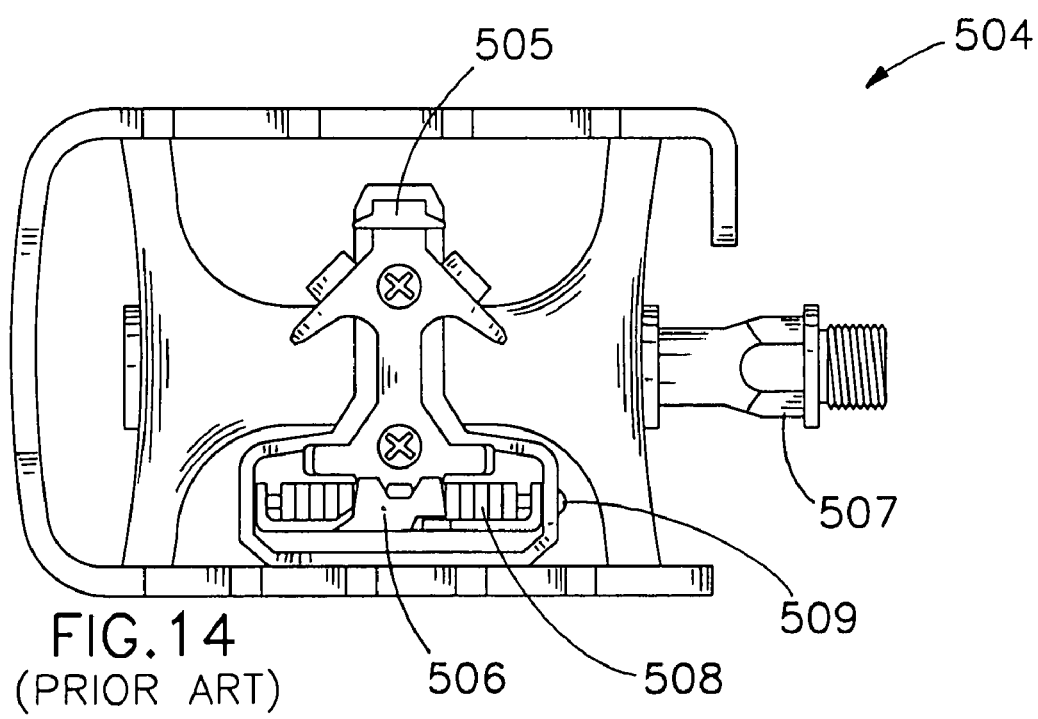
FIG. 14 is a top plan view of the second prior art bicycle pedal shown in FIG. 13.

Referring to FIGS. 7a, 7b, 7c, 18, 19, 20, 21 and 22, there is shown at 570 the present invention flip-flop bicycle pedal. The present invention flip-flop bicycle pedal 570 is a combination of the first prior art bicycle pedal 500 (see FIG. 12) and the second prior art bicycle pedal 504 (see FIGS. 13 and 14). The flip-flop bicycle pedal 570 comprises a main body 199 and a threaded spindle bolt or connector 200 which is threadedly connected to a bicycle pedal crank (not shown), where the main body 199 is pivotable about a transverse axis 574 of the bicycle. The main body 199 has a top or first side 576 and a bottom or second side 578. The top side 576 is similarly configured with the first prior art bicycle pedal 500 (see FIG. 12) and includes a toe cleat clamping mechanism which has a front recess 202 for receiving the front tongue 224 of the first prior art shoe cleat (see FIGS. 8a and 8b), a rear spring-loaded plate 204 pivotably connected to the main body 199 by a bolt 205 and an internal spring 580 wound around the bolt 205. When a force is applied at a surface 207 by the first prior art shoe cleat (see FIG. 19 and shown in dashed lines), the spring-loaded plate 204 moves away from the main body 199 such that the rear tongue 226 (see FIG. 20 and shown in dashed lines) of the first prior art shoe cleat falls inside the recess 209 and the spring-loaded plate 204 springs back into a locking position, thereby locking the first prior art shoe cleat to the top side of the main body 199 of the flip-flop pedal 570.

Figure 23:
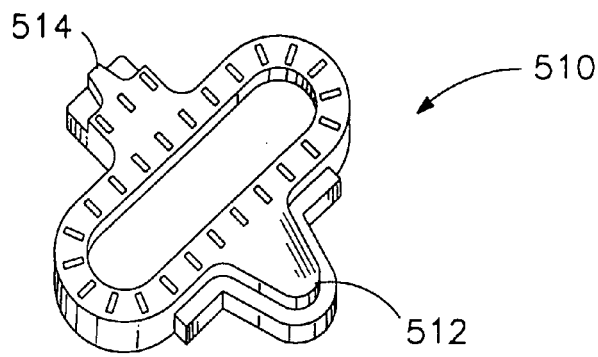
FIG. 23 is a perspective view of a prior art of a second conventional type shoe cleat.

The bottom side 578 of the flip-flop bicycle pedal 570 is similarly configured with the second prior art bicycle pedal 504 (see FIGS. 13 and 14) and includes a toe cleat clamping plate or mechanism 212 which is smaller than the toe cleat clamping mechanism located on the top side 576. The toe cleat clamping mechanism 212 is mounted to the main body 199 by retaining screws 214 and 215 (see FIG. 18). The front tongue 512 of the second prior art shoe cleat 510 (see FIG. 23) is first inserted into the locking feature 208 while the rear tongue 514 engages with and pushes against the spring-loaded retaining plate 216 (see FIG. 21 and shown in dashed lines) causing the spring-loaded plate 216 to move back (see FIG. 22 and shown in dashed lines). A spring 582 is held in place by a bolt 211 (see FIG. 7b) mounted in the main body 199 of the flip-flop bicycle pedal 570. The spring 582 is wounded around the bolt 211. When a force is applied on the spring-loaded plate 216 by the second prior art shoe cleat (see FIG. 21 and shown in dashed lines), the spring-loaded plate 216 moves away from the main body 199 (see FIG. 22 and shown in dashed lines) such that the rear tongue 514 of the second prior art shoe cleat 510 falls inside the recess 210 and the spring-loaded plate 216 springs back into a locking position, thereby locking the second prior art shoe cleat 510 to the bottom side 578 of the main body 199 of the flip-flop pedal 570.

Figure 27:
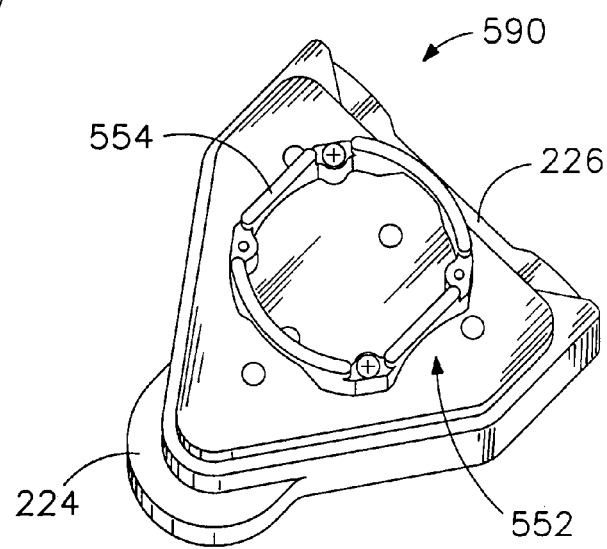
FIG. 27 is a perspective view of a pedal adapter in accordance with the present invention which can be used with the fifth prior art type shoe cleat shown in FIG. 26.
Figure 28:
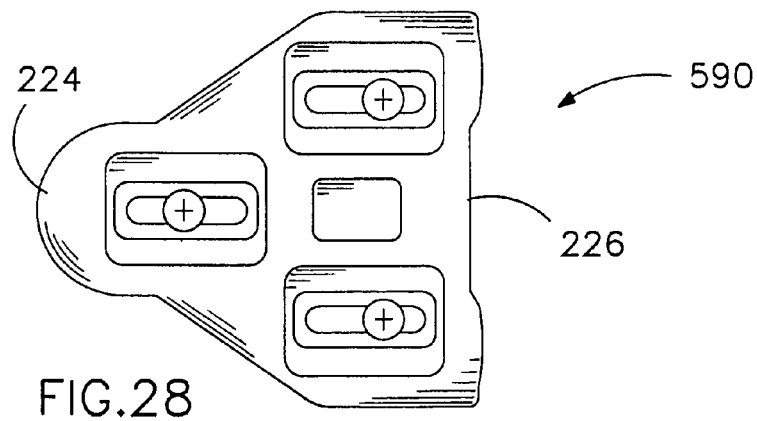
FIG. 28 is a plan view of the pedal adapter shown in FIG. 27.

Referring to FIGS. 27 and 28, alternatively, there is shown at 590 an alternative embodiment of the present invention pedal adapter shown in FIGS. 9a, 9b, 9c, 10a, and 10b. In this embodiment, the pedal adapter 590 is a combination of the first prior art shoe cleat (see FIG. 8a) and the fifth prior art bicycle pedal 552. The pedal adapter 590 can be used with the present invention flip-flop bicycle pedal 570 or the first prior art bicycle pedal 500 (see FIG. 12).

It will be appreciated that the present invention is not limited to the use of the flip-flop bicycle pedal discussed in this application. It is emphasized that while the present invention pedal adapter is preferredly used with the flip-flop bicycle pedal, it is also within the spirit and scope of the present invention to utilize it with the first prior art bicycle pedal shown in FIG. 12. The following description will be related to the flip-flop bicycle pedal 570.

Figure 17:
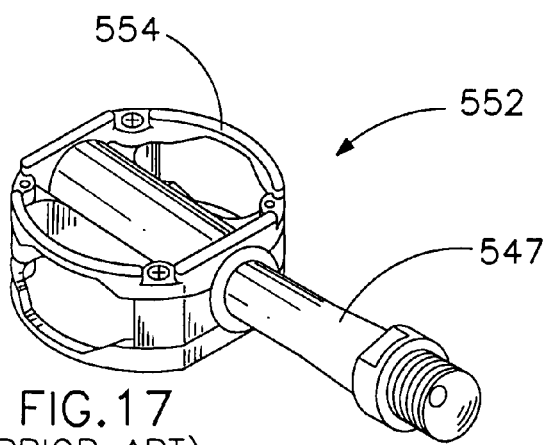
FIG. 17 is a perspective view of a prior art of a fifth conventional type bicycle pedal.
Figure 18:
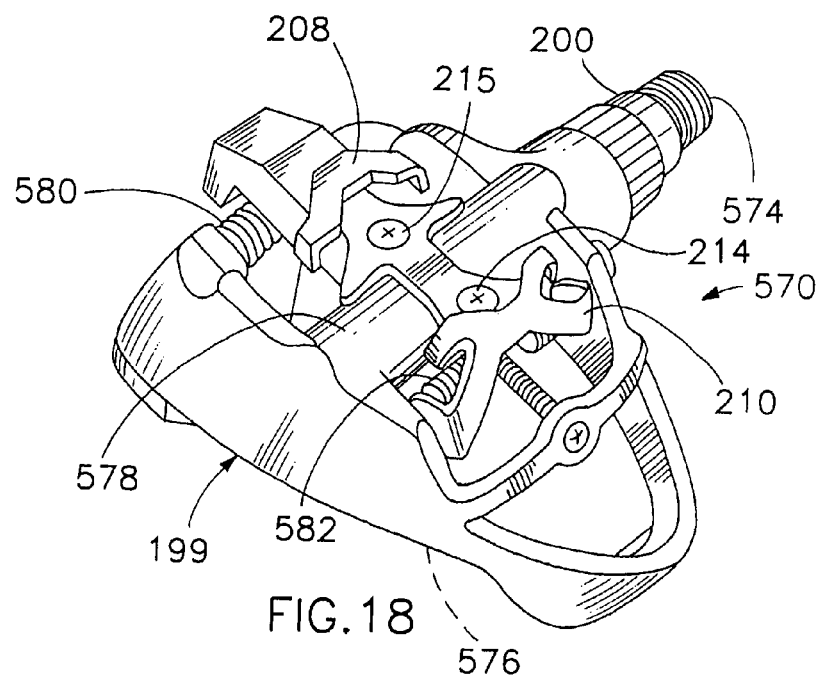
FIG. 18 is a perspective view of the present invention flip-flop pedal.
Figure 19:
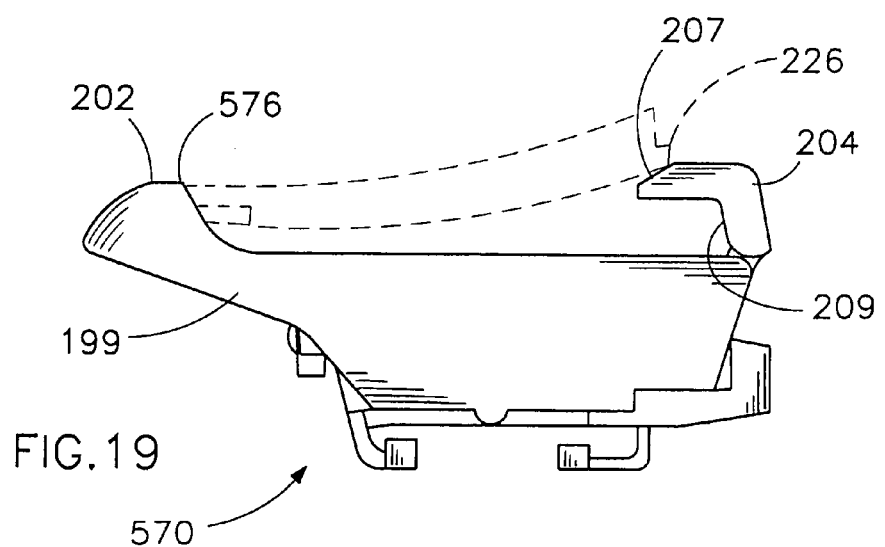
FIG. 19 is a side elevational view of the present invention flip-flop pedal showing the first side unengaged with the first prior art shoe cleat and in a locking positioned.
Figure 20:
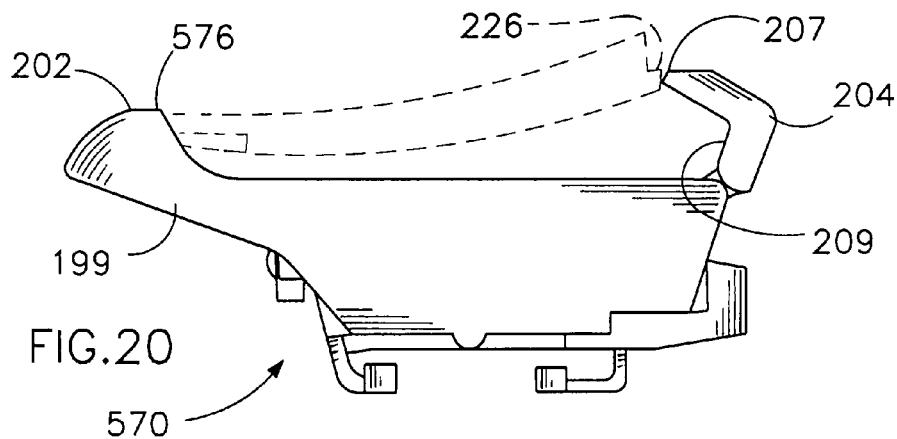
FIG. 20 is a side elevational view of the present invention flip-flop pedal showing the first side engaged with the first prior art shoe cleat and the spring-loaded plate moving away from the pedal.
Figure 21:
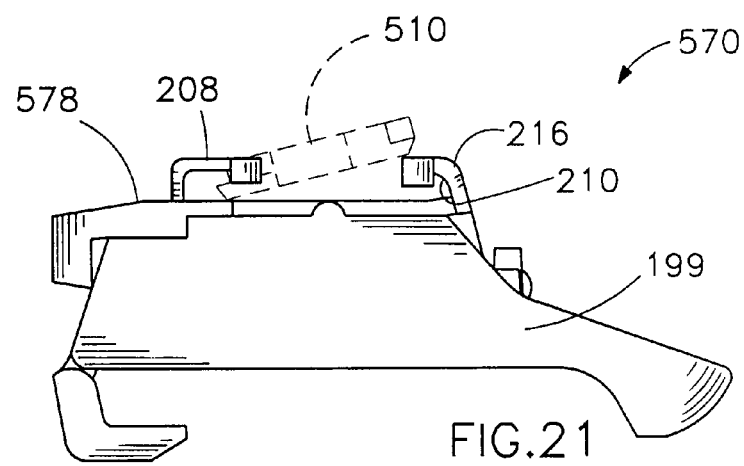
FIG. 21 is a side elevational view of the present invention flip-flop pedal showing the second side unengaged with the second prior art shoe cleat and in a locking positioned.
Figure 22:
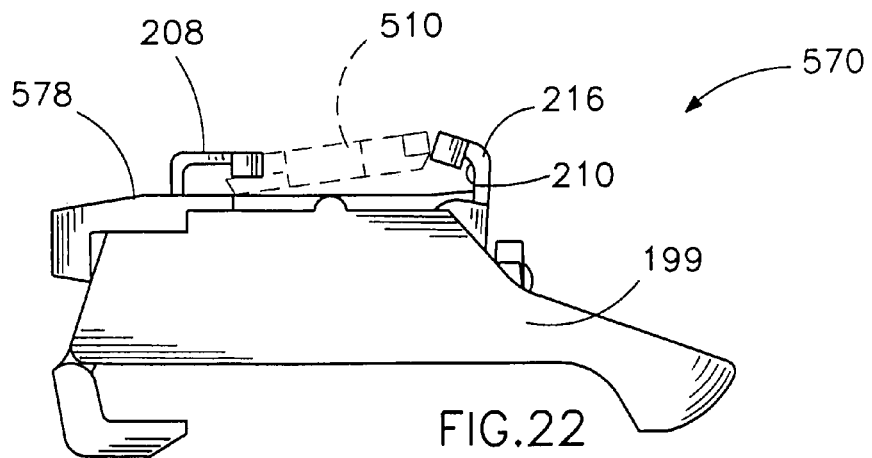
FIG. 22 is a side elevational view of the present invention flip-flop pedal showing the second side engaged with the second prior art shoe cleat and the spring-loaded plate moving away from the pedal.

In this pedal adapter 590, the circular flange 554 which is identical to the circular flange 554 shown in FIG. 17 is attached to the top of the first prior art shoe cleat as shown. The front tongue 224 of the pedal adapter 590 is first fitted into the recess 202 of the flip-flop bicycle pedal 570 (see FIGS. 7a, 7b, 18, 19, and 20) while the rear tongue 226 pushes down onto the spring loaded retaining plate 204. The downwards force causes the retaining plate 204 to move away from the body of the pedal and the rear tongue 226 of the adapter 590 to fall into the recess 209 and thereby locks the adapter 590 to the flip-flop pedal 570.

Figure 26:
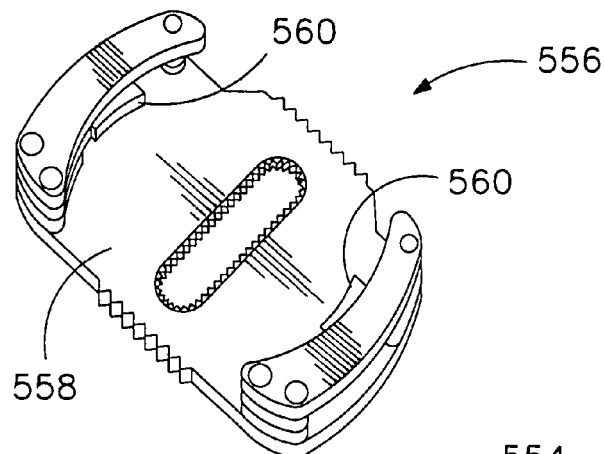
FIG. 26 is a perspective view of a prior art of a fifth conventional type shoe cleat.

The cyclist wearing the fifth prior art shoe cleat 556 (see FIG. 26) can then mount his or her shoe cleat 556 to the circular flange 554 of the pedal adapter 590, thereby securing the shoe cleat to the pedal adapter as discussed above.

Figure 15:
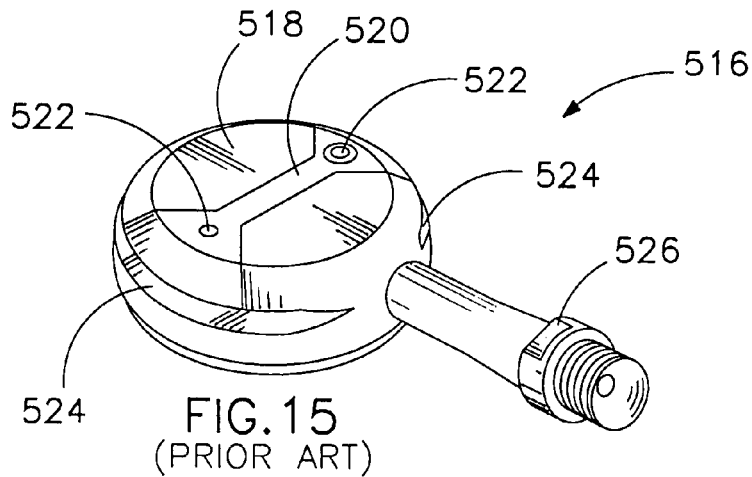
FIG. 15 is a perspective view of a prior art of a third conventional type bicycle pedal.

Referring to FIGS. 9a, 9b and 9c, there is shown a preferred embodiment of the present invention pedal adapter. In this embodiment, the pedal adapter is a combination of the first prior art shoe cleat (see FIG. 8a) and the third prior art bicycle pedal 516 (see FIG. 15). The pedal adapter can be used with the present invention flip-flop bicycle pedal 570 or the first prior art bicycle pedal 500 (see FIG. 12).

It will be appreciated that the present invention is not limited to the use of the flip-flop bicycle pedal discussed in this application. It is emphasized that while the present invention pedal adapter is preferredly used with the flip-flop bicycle pedal, it is also within the spirit and scope of the present invention to utilize it with the first prior art bicycle pedal shown in FIG. 12. The following description will be related to the flip-flop bicycle pedal 570.

In this pedal adapter, the bow tie plate 220 is identical to the bow tie plate 520 of the third prior art bicycle pedal 516 (see FIG. 15) and is mounted on top of and integral with the shoe cleat. The surface 221 and the two tongues 224 and 226 are identical to those on the first prior art shoe cleat as shown in FIGS. 8a and 8b. The front tongue 224 of the pedal adapter is first fitted into the recess 202 of the flip-flop bicycle pedal 570 (see FIGS. 7a, 7b, 18, 19, and 20) while the rear tongue 226 pushes down onto the spring loaded retaining plate 204. The downward force causes the retaining plate 204 to move away from the body of the pedal and the rear tongue 226 of the adapter to fall into the recess 209 and thereby locks the adapter 590 to the flip-flop pedal 570.

Figure 24:
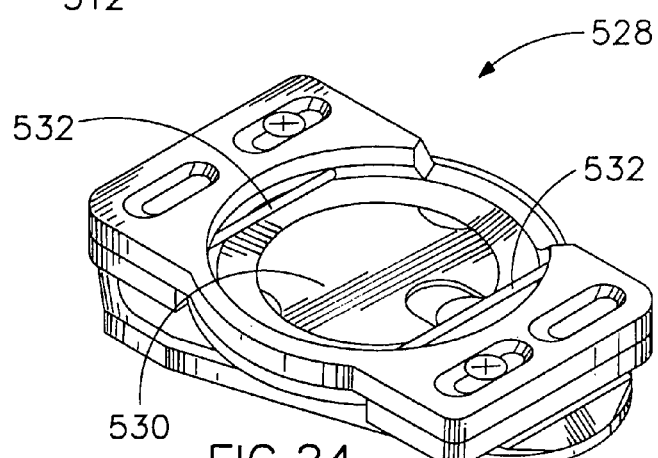
FIG. 24 is a perspective view of a prior art of a third conventional type shoe cleat.

The cyclist wearing the third prior art shoe cleat 528 (see FIG. 24) can then mount his or her shoe cleat 528 such that the recess 530 encompasses the plate 220 and then the two rods 532 engage with grooves to secure the third prior art shoe cleat 528 to the pedal adapter as discussed above.

Referring to FIGS. 10a and 10b, there is shown another alternative embodiment of the present invention pedal adapter. In this embodiment, the pedal adapter is a combination of the first prior art shoe cleat (see FIG. 8a) and the fourth prior art bicycle pedal 534 (see FIG. 16). The pedal adapter can be used with the present invention flip-flop bicycle pedal 570 or the first prior art bicycle pedal 500 (see FIG. 12).

It will be appreciated that the present invention is not limited to the use of the flip-flop bicycle pedal discussed in this application. It is emphasized that while the present invention pedal adapter is preferredly used with the flip-flop bicycle pedal, it is also within the spirit and scope of the present invention to utilize it with the first prior art bicycle pedal shown in FIG. 12. The following description will be related to the flip-flop bicycle pedal 570.

Figure 16:
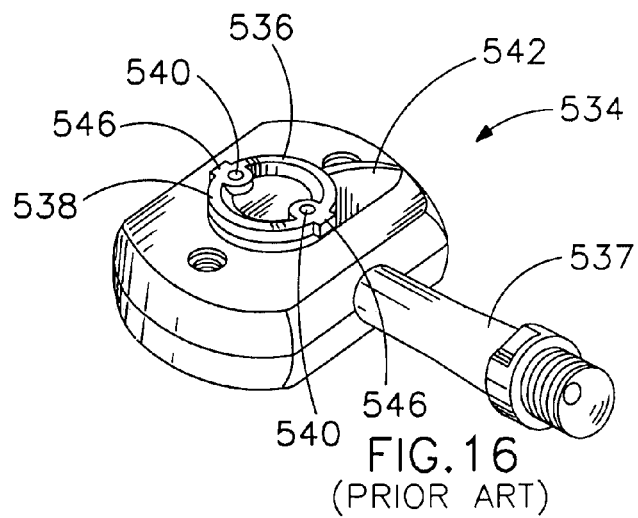
FIG. 16 is a perspective view of a prior art of a fourth conventional type bicycle pedal.

In this pedal adapter, the upper portion of the pedal adapter is identical to the fourth prior art bicycle pedal 534 discussed in FIG. 16, and the description thereof will not be repeated.

When in use, the front tongue 224 of the pedal adapter is first fitted into the recess 202 of the flip-flop bicycle pedal 570 (see FIGS. 7a, 7b, 18, 19, and 20) while the rear tongue 226 pushes down onto the spring loaded retaining plate 204. The downward force causes the retaining plate 204 to move away from the body of the pedal and the rear tongue 226 of the adapter to fall into the recess 209 and thereby locks the adapter 590 to the flip-flop pedal 570.

Figure 25:
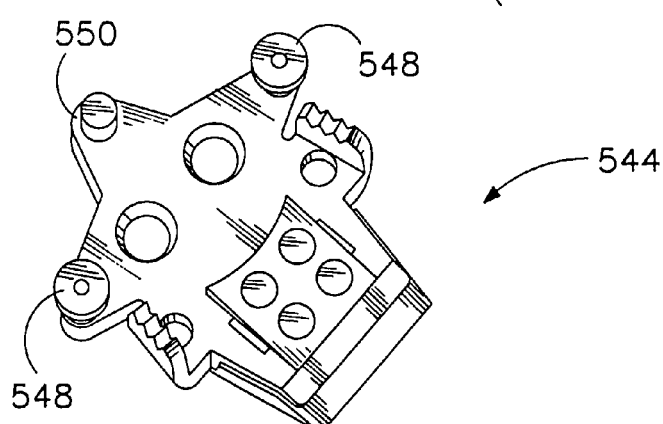
FIG. 25 is a perspective view of a prior art of a fourth conventional type shoe cleat.

The cyclist wearing the fourth prior art shoe cleat 544 (see FIG. 25) can then mount his or her shoe cleat 544 such that when the cyclist rotates his or her shoe toward the bicycle's frame, two protruding lugs 270 on each side of the metal ring 256 are engaged by a pair of retaining flanges 548 to secure the fourth prior art shoe cleat 544 thereto. A stopping flange 550 is also provided and engages with the sloped ramp 258 to stop the rotation of the fourth prior art shoe cleat 544, thereby fastening the fourth prior art shoe cleat to the pedal adapter.

Defined in detail, the present invention is a flip-flop bicycle pedal, comprising: (a) a main body pivotable about a transverse axis and having a spindle bolt for connecting to a bicycle, a top side and a bottom side; (b) said top side having a first top toe cleat clamp which conforms to a bottom of a road type bicycle shoe cleat, the first top toe cleat clamp having a front recess for receiving a front tongue of the road type bicycle shoe cleat, said top side also having a first top rear spring-loaded retaining plate pivotable on said main body, the first top rear spring-loaded retaining plate having a recess for receiving a rear tongue of the road type bicycle shoe cleat and when a force is applied to the first top rear spring-loaded retaining plate, the first top rear spring-loaded retaining plate moves away from said main body such that the rear tongue engages the recess of the first top rear spring-loaded retaining plate, where the first top rear spring-loaded retaining plate springs back into a locking position, and thereby locks the rear tongue of the road type bicycle shoe cleat thereto; and (c) said bottom side having a second bottom toe cleat clamp which is smaller than said first top toe cleat clamp of said top side and conforms to a bottom of a mountain bicycle type shoe cleat, the second bottom toe cleat clamp of said bottom side having a front locking member located adjacent to said front top rear spring-loaded retaining plate of said top side for receiving a front tongue of the mountain bicycle type shoe cleat, said bottom side also having a second bottom rear spring-loaded retaining member pivotable on said main body such that a rear tongue of the mountain bicycle type shoe cleat engages inside a recess of the second bottom rear spring-loaded retaining plate of said bottom side, where the second bottom rear spring-loaded plate of said bottom side springs back into a locking position, and thereby locks the rear tongue of the mountain bicycle type shoe cleat thereto.

Defined broadly, the present invention is a bicycle pedal, comprising: (a) a main body pivotable about a transverse axis and having a spindle bolt for connecting to a bicycle, a first cleat clamp side and a second cleat clamp side; (b) said first cleat clamp side conforming to a bottom of a road type bicycle shoe cleat and having a recess for receiving a first tongue of the road type bicycle shoe cleat, said first cleat clamp side also having a first spring-loaded retaining plate pivotable on said main body for receiving a second tongue of the road type bicycle shoe cleat and when a force is applied to the first spring-loaded retaining plate, the first spring-loaded retaining plate moves away from said main body such that the second tongue engages the first spring-loaded retaining plate, where the first spring-loaded retaining plate springs back into a locking position, and thereby locks the second tongue of the road type bicycle shoe cleat thereto; and (c) said second cleat clamp side being smaller than said first cleat clamp side and conforming to a bottom of a mountain bicycle type shoe cleat, said second cleat clamp side having a locking member located adjacent to said first spring-loaded retaining plate of said first cleat clamp side for receiving a first tongue of the mountain bicycle type shoe cleat, said second cleat clamp side also having a second spring-loaded retaining member pivotable on said main body such that a second tongue of the mountain bicycle type shoe cleat engages the second spring-loaded retaining member of said second cleat clamp side, where the second spring-loaded retaining member of said second cleat clamp side springs back into a locking position, and thereby locks the second tongue of the mountain bicycle type shoe cleat thereto.

Defined more broadly, the present invention is a bicycle pedal, comprising: (a) a main body pivotable about a transverse axis and having a spindle bolt for connecting to a bicycle, a first side and a second side; (b) said first side conforming to a bottom of a road type bicycle shoe cleat and having means for receiving a first tongue of the road type bicycle shoe cleat, said first side also having a first spring-loaded retaining plate pivotable on the main body for receiving a second tongue of the road type bicycle shoe cleat and when a force is applied to the first spring-loaded retaining plate, the first spring-loaded retaining plate moves away from said main body such that the second tongue is retained within the spring-loaded retaining plate, where the first spring-loaded retaining plate moves back into a locking position, and thereby locks the second tongue of the road type bicycle shoe cleat thereto; and (c) said second side conforming to a bottom of a mountain bicycle type shoe cleat and having a locking member for receiving a first tongue of the mountain bicycle type shoe cleat, said second side also having a second spring-loaded retaining member pivotable on said main body such that a second tongue of the mountain bicycle type shoe cleat is retained within the second spring-loaded retaining member of said second side, where the second spring-loaded retaining member of said second side moves back into a locking position, and thereby locks the second tongue of the mountain bicycle type shoe cleat thereto.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A flip-flop bicycle pedal, comprising:
  a. a main body pivotable about a transverse axis and having a spindle bolt for connecting to a bicycle, a top side and a bottom side;
  b. said top side having a first top toe cleat clamp which conforms to a bottom of a road type bicycle shoe cleat, the first top toe cleat clamp having a front recess for receiving a front tongue of the road type bicycle shoe cleat, said top side also having a first top rear spring-loaded retaining plate pivotable on said main body, the first top rear spring-loaded retaining plate having a recess for receiving a rear tongue of the road type bicycle shoe cleat and when a force is applied to the first top rear spring-loaded retaining plate, the first top rear spring-loaded retaining plate moves away from said main body such that the rear tongue engages the recess of the first top rear spring-loaded retaining plate, where the first top rear spring-loaded retaining plate springs back into a locking position, and thereby locks the rear tongue of the road type bicycle shoe cleat thereto; and
  c. said bottom side having a second bottom toe cleat clamp which is smaller than said first top toe cleat clamp of said top side and conforms to a bottom of a mountain bicycle type shoe cleat, the second bottom toe cleat clamp of said bottom side having a front locking member located adjacent to said front top rear spring-loaded retaining plate of said top side for receiving a front tongue of the mountain bicycle type shoe cleat, said bottom side also having a second bottom rear spring-loaded retaining member pivotable on said main body such that a rear tongue of the mountain bicycle type shoe cleat engages inside a recess of the second bottom rear spring-loaded retaining plate of said bottom side, where the second bottom rear spring-loaded plate of said bottom side springs back into a locking position, and thereby locks the rear tongue of the mountain bicycle type shoe cleat thereto.

2. A bicycle pedal, comprising:
  a. a main body pivotable about a transverse axis and having a spindle bolt for connecting to a bicycle, a first cleat clamp side and a second cleat clamp side;
  b. said first cleat clamp side conforming to a bottom of a road type bicycle shoe cleat and having a recess for receiving a first tongue of the road type bicycle shoe cleat, said first cleat clamp side also having a first spring-loaded retaining plate pivotable on said main body for receiving a second tongue of the road type bicycle shoe cleat and when a force is applied to the first spring-loaded retaining plate, the first spring-loaded retaining plate moves away from said main body such that the second tongue engages the first spring-loaded retaining plate, where the first spring-loaded retaining plate springs back into a locking position, and thereby locks the second tongue of the road type bicycle shoe cleat thereto; and
  c. said second cleat clamp side being smaller than said first cleat clamp side and conforming to a bottom of a mountain bicycle type shoe cleat, said second cleat clamp side having a locking member located adjacent to said first spring-loaded retaining plate of said first cleat clamp side for receiving a first tongue of the mountain bicycle type shoe cleat, said second cleat clamp side also having a second spring-loaded retaining member pivotable on said main body such that a second tongue of the mountain bicycle type shoe cleat engages the second spring-loaded retaining member of said second cleat clamp side, where the second spring-loaded retaining member of said second cleat clamp side springs back into a locking position, and thereby locks the second tongue of the mountain bicycle type shoe cleat thereto.

3. A bicycle pedal, comprising:

a. a main body pivotable about a transverse axis and having a spindle bolt for connecting to a bicycle, a first side and a second side;

b. said first side conforming to a bottom of a road type bicycle shoe cleat and having means for receiving a first tongue of the road type bicycle shoe cleat, said first side also having a first spring-loaded retaining plate pivotable on the main body for receiving a second tongue of the road type bicycle shoe cleat and when a force is applied to the first spring-loaded retaining plate, the first spring-loaded retaining plate moves away from said main body such that the second tongue is retained within the spring-loaded retaining plate, where the first spring-loaded retaining plate moves back into a locking position, and thereby locks the second tongue of the road type bicycle shoe cleat thereto; and c. said second side conforming to a bottom of a mountain bicycle type shoe cleat and having a locking member for receiving a first tongue of the mountain bicycle type shoe cleat, said second side also having a second spring-loaded retaining member pivotable on said main body such that a second tongue of the mountain bicycle type shoe cleat is retained within the second spring-loaded retaining member of said second side, where the second spring-loaded retaining member of said second side moves back into a locking position, and thereby locks the second tongue of the mountain bicycle type shoe cleat thereto.

4. The bicycle pedal in accordance with claim 3, wherein said second side is smaller than said first side.

* * * * *